US007961873B2

(12) United States Patent
Ibrahim

(10) Patent No.: US 7,961,873 B2
(45) Date of Patent: Jun. 14, 2011

(54) PASSWORD PROTOCOLS USING XZ-ELLIPTIC CURVE CRYPTOGRAPHY

(75) Inventor: Mohammad K. Ibrahim, Leicester (GB)

(73) Assignee: King Fahd University of Petroleum and Minerals, Dhahran (SA)

( * ) Notice: Subject to any disclaimer, the term of this patent is extended or adjusted under 35 U.S.C. 154(b) by 707 days.

(21) Appl. No.: 12/044,518

(22) Filed: Mar. 7, 2008

(65) Prior Publication Data
US 2008/0165955 A1 Jul. 10, 2008

Related U.S. Application Data

(63) Continuation-in-part of application No. 10/790,677, filed on Mar. 3, 2004, now Pat. No. 7,379,546.

(51) Int. Cl.
H04K 1/00 (2006.01)
H04L 9/00 (2006.01)
(52) U.S. Cl. .................................................. 380/28
(58) Field of Classification Search .............. 380/28, 380/30, 44, 259, 263, 277, 278, 282, 286; 713/176
See application file for complete search history.

(56) References Cited

U.S. PATENT DOCUMENTS

| | | | | |
|---|---|---|---|---|
| 6,088,453 A * | 7/2000 | Shimbo | ............ | 380/28 |
| 6,714,648 B2 * | 3/2004 | Miyazaki et al. | ............... | 380/30 |
| 6,876,745 B1 * | 4/2005 | Kurumatani | ............ | 380/28 |
| 7,162,033 B1 * | 1/2007 | Coron | ............ | 380/30 |
| 7,379,546 B2 * | 5/2008 | Ibrahim | ............ | 380/28 |
| 7,483,533 B2 * | 1/2009 | Ibrahim | ............ | 380/44 |
| 7,483,534 B2 * | 1/2009 | Ibrahim | ............ | 380/44 |
| 2001/0046291 A1 * | 11/2001 | Vanstone et al. | ............. | 380/28 |
| 2002/0065574 A1 * | 5/2002 | Nakada | ............ | 700/121 |
| 2003/0059042 A1 * | 3/2003 | Okeya et al. | ............ | 380/30 |
| 2003/0123656 A1 * | 7/2003 | Izu et al. | ............ | 380/30 |
| 2004/0114756 A1 * | 6/2004 | Moller et al. | ............ | 380/30 |
| 2004/0228478 A1 * | 11/2004 | Joye | ............ | 380/28 |
| 2004/0247114 A1 * | 12/2004 | Joye | ............ | 380/28 |
| 2007/0053506 A1 * | 3/2007 | Takashima | ............ | 380/28 |
| 2007/0177721 A1 * | 8/2007 | Itoh et al. | ............ | 380/28 |

* cited by examiner

*Primary Examiner* — Beemnet W Dada
(74) *Attorney, Agent, or Firm* — Lowe Hauptman Ham & Berner, LLP

(57) ABSTRACT

Remote user authentication is provided using a password protocol based on elliptic curve cryptography. More specifically, the process uses the X-coordinate and the Z-coordinate of an elliptic curve when represented in projective coordinates, wherein point addition is defined over three dimensional space that includes the projective coordinate.

21 Claims, 5 Drawing Sheets

US 7,961,873 B2

PASSWORD PROTOCOLS USING XZ-ELLIPTIC CURVE CRYPTOGRAPHY

CROSS REFERENCE

This application is a continuation-in-part of U.S. application Ser. No. 10/790,677 file Mar. 3, 2004, now U.S. Pat. No. 7,379,546 titled "Method for XZ-Elliptic Curve Cryptography," which is incorporated herein by reference in its entirety for all purposes.

TECHNICAL FIELD

The following description relates generally to cryptography and more particularly to a password protocols and authentication using a group of points on an elliptic curve over a finite field.

BACKGROUND

Cryptography provides privacy and authentication for remote communications and data storage. Privacy may be provided by encrypting data using symmetric cryptography. Symmetric cryptography uses a single mathematical key to encrypt and decrypt data. However, symmetric cryptography, whose algorithms use the same key to encrypt and decrypt a message require the sharing of a secret for authentication. Authentication may be provided using the functions of user identification, data integrity, and message non-repudiation.

Asymmetric or public-key cryptography enables encrypted communication between users who have not previously established a shared secret key. Public-key cryptography is based on key pairs. A key pair consists of a private key and a public key. The private key is only known by its owner, while the public key is typically associated with its owner in an authenticated manner and shared with others. The public key is used to encrypt the message, and the private key is used to decrypt the message. As a result, the encrypted message may be sent using an insecure channel with the assurance that only the intended recipient can decrypt it. Public key encryption may be interactive (e.g., encrypting a telephone conversation) or non-interactive (e.g., encrypting electronic mail). Identification protocols may be used to provide user identification. For example, digital signature may be used to provide data integrity, message non-repudiation, and user identification. A public key is used to encrypt or verify a signature of a message, and a private key is used to decrypt or generate a signature of a message.

U.S. Pat. No. 4,200,770, entitled "CRYPTOGRAPHIC APPARATUS AND METHOD," describes the use of cryptographic key pairs and their application to the problem of key agreement over an insecure communication channel. The algorithms specified in U.S. Pat. No. 4,200,770 relies on the difficulty of the mathematical problem of finding a discrete logarithm for their security. U.S. Pat. No. 4,200,770 is hereby incorporated herein by reference in its entirety for all purposes.

Security of a discrete-logarithm based crypto algorithm may be undermined by performing the inverse of modular exponentiation (i.e., a discrete logarithm). Although mathematical methods for finding a discrete logarithm exist (e.g., the Number Field Sieve), these methods are hard to complete in a reasonable time period if certain conditions are met in the specification of the crypto algorithm, for example, if sufficiently large numbers are used. Large numbers require more time and computing power to find the discrete logarithm and break the cryptograph. However, large numbers result in long public keys and slow transmissions of cryptographic data. In addition, the use of very large numbers also requires longer processing times and greater computational power to perform the crypto algorithm. As a result, cryptographers continue to search for ways to minimize the size of the numbers used and the computational power required to perform the encryption and/or authentication algorithms.

A discrete-logarithm based crypto algorithm can be performed in any mathematical set in which certain algebraic rules hold true. In mathematical language, the set is a finite cyclic group. The discrete logarithm problem may be more difficult to solve in one group than in another for numbers of comparable size. As a result, the choice of the group is critical to the cryptographic system.

Typically, the more difficult the discrete logarithm problem is, the smaller the numbers that are used to implement the crypto algorithm. Of course, working with small numbers is easier and faster than working with large numbers. Using small numbers also results in a better performing, faster cryptographic system that requires less storage. Therefore, by carefully choosing the right group, a user may be able to work with smaller numbers, make a faster cryptographic system, and get the same, or better, cryptographic strength than a cryptographic system using larger numbers.

The state of elliptic curve cryptography is described in a paper by Neal Koblitz, Alfred Meneges and Scott Vanstone, Design, Codes and Cryptography 19 173-193 (2000) which is incorporated herein in its entirety by reference for all purposes. More recent developments are described in the U.S. Pat. No. 6,424,712 to of Vanstone et al. and the published U.S. Patent Applications Nos. 2003/0059042 to Okeya et al., 2003/0123656 to Izu et al., and 2003/0142820 to Futa et al., all of which are incorporated herein by reference in there entirety for all purposes. Earlier U.S. Pat. No. 4,200,770 to Hellman et al. discloses an earlier cryptographic apparatus and method. These disclosures all address the issue of speeding up elliptic curve scale multiplications.

SUMMARY

In one general aspect, the system and methods described herein provide remote user authentication using a password protocol based on elliptic curve cryptography. More specifically, the process uses the X-coordinate and the Z-coordinate of an elliptic curve when represented in projective coordinates, wherein point addition is defined over three dimensional space that includes the projective coordinate.

The password protocols described below are based on a method of applying projective coordinates in two stages. In the first of the two stages, a projective coordinate is used to embed extra message data bits in the Z coordinate. In the second stage, a projective coordinate is used to remove a division operation at each iteration of the process and to randomize the computation (to provide a counter measure against differential power analysis).

In one general aspect, a method for authenticating the identity of a device over an unsecured communications channel using a selected elliptic curve and a base point includes encrypting a password using a deterministic and non-iterative process for embedding data using points on an elliptic curve defined over a finite field and represented in projective coordinates; transmitting the encrypted data over the communication channel to the receiving device; and authenticating the password, where the projective coordinates ensure that the elliptic curve and its twist are isomorphic to each other. The isomorphic relationship between the elliptic curve and its twist may be obtained as a result of the selected projective coordinates to ensure that any bit string whose equivalent binary value is an element of the underlying finite field has a bijective relationship between the bit string and a point on the elliptic curve or its twist.

In another general aspect, a method for authenticating the identity of a first device by a second device over an unsecured communications channel using a password protocol based on shared key $EC^3$ cryptography includes agreeing by the first and second devices on a set $EC^3$ by selecting an elliptic curve and a base point; converting a password of the first device of the device to a first key; determining a cipher point based on the first key; and transmitting bits of the cipher point over the communications channel using the X-coordinate and the Z-coordinate of an elliptic curve when represented in projective coordinates, and wherein the projective coordinates ensure that the elliptic curve and its twist are isomorphic to each other. The second device may convert a stored password of the first device to a second key; determine a cipher point based on the second key; receive the transmitted bits of the cipher point associated with the first key; determine the cipher point of the second key is equal to the cipher point of the first key or one of its equivalents; and authenticate the password.

In another general aspect, a method for authenticating the identity of a first device having a password by a second device over an unsecured communications channel using a password protocol based on shared key $EC^3$ cryptography using a selected elliptic curve and base point $(X_B, Y_B, Z_B)$ includes converting the password or its image under a one-way function into an equivalent scalar value, $k_U$; determining a first cipher point $(X_C, Y_C, Z_C)$ by scalar multiplication of a scalar value, $k_U$, with the base point, $(X_B, Y_B, Z_B)$; and transmitting bits of the X-coordinate, $X_C$, and the Z-coordinate, $Z_C$, of the first cipher point to second device for password verification. The second device may then convert the password or its image stored by the second device under a one-way function into an equivalent scalar value, $k_{US}$; determine a second cipher point $(X_{SC}, Y_{SC}, Z_{SC})$ by scalar multiplication of the scalar value $k_{US}$, with the base point, $(X_B, Y_B, Z_B)$; recover the first cipher point from the transmitted bits; determine if the second cipher point is equal to first cipher point or one of its equivalent points based on the transmitted bits; and authenticate the identity of the first device.

In another general aspect, a method for authenticating the identity of a first device having a password by a second device over an unsecured communications channel using a password protocol based on a set $EC^3$ using a selected elliptic curve includes converting the password or its image under a one-way function into a secret bit string, $k_p$; dividing the secret key string $k_p$ into three binary sub-strings, $k_{p1}$, $k_{p2}$ and $k_{p3}$; embedding the secret sub-string $k_{p1}$ and $k_{p2}$ into an X-coordinate and Z-coordinate using mappings between the selected elliptic curve equation and its twist to ensure that the resulting point satisfies the selected elliptic curve to obtain the password embedded point, $(X_P, Y_P, Z_P)$; determining a first cipher point $(X_C, Y_C, Z_C)$ by scalar multiplication of the scalar value, $k_{p3}$, with the password embedded point, $(X_P, Y_P, Z_P)$; and transmitting bits of the X-coordinate, $X_C$, and the Z-coordinate, $Z_C$, of the first cipher point $(X_C, Y_C, Z_C)$ to the second device. The second device may then convert a stored password of the first device or its image under a one-way function into a secret bit string, $k_{Sp}$; divide the secret key string $k_{Sp}$ into three binary sub-strings $k_{Sp1}$, $k_{Sp2}$ and $k_{Sp3}$; embed the secret sub-string $k_{Sp1}$ and $k_{Sp2}$ into the X-coordinate and Z-coordinate using mappings between the selected elliptic curve and its twist to ensure that the resulting point satisfies the selected elliptic curve to obtain the password embedded point, $(X_{SP}, Y_{SP}, Z_{SP})$; determine a second cipher point $(X_{SC}, Y_{SC}, Z_{SC})$ by scalar multiplication of the scalar value, $k_{Sp3}$, with the password embedded point, $(X_P, Y_P, Z_P)$; recover the first cipher point from the transmitted bits; and determine the second cipher point $(X_{SC}, Y_{SC}, Z_{SC})$ is equal to the first cipher point $(X_C, Y_C, Z_C)$ or one of its equivalent points; and authenticate the user.

In another general aspect, a method for authenticating the identity of a first device having a password by a second device over an unsecured communications channel using a password protocol based on public key $EC^3$ cryptography using a selected elliptic curve includes generating a random bit sting as a secret key, $k_s$, of the second device; dividing the secret key $k_s$ into three binary sub-strings, $k_{S1}$, $k_{S2}$ and $k_{S3}$; embedding the secret sub-string $k_{S1}$ and $k_{S2}$ into the X-coordinate and Z-coordinate using mappings between the selected elliptic curve and its twist to ensure that the resulting point satisfies the selected elliptic curve to obtain the secret-key embedded point of the second device, $(X_S, Y_S, Z_S)$; determining a public key of the second device $(X_{SPu}, Y_{SPu}, Z_{SPu})$ by scalar multiplication of the scalar value of the third secret sub-string $k_{S3}$ with the secret-key embedded point of the server, $(X_S, Y_S, Z_S)$; and transmitting the public key of the second device to the first device. The first device may then convert a password or its image under a one-way function into an equivalent scalar value, $k_U$; determine a first cipher point $(X_C, Y_C, Z_C)$ by scalar multiplication of the scalar value, $k_U$, with the server pubic key, $(X_{SPu}, Y_{SPu}, Z_{SPu})$; and transmit bits of the X-coordinate, $X_C$, and the Z-coordinate, $Z_C$, of the first cipher point $(X_C, Y_C, Z_C)$ to the second device. The second device converts the password or its image stored by the second device under a one-way function to an equivalent scalar value, $k_{US}$; determines a second cipher point $(X_{SC}, Y_{SC}, Z_{SC})$ by scalar multiplication of the scalar value, $k_{US}$, with the server pubic key, $(X_{SPu}, Y_{SPu}, Z_{SPu})$; recovers the first cipher point from the transmitted bits; and determines the second cipher point $(X_{SC}, Y_{SC}, Z_{SC})$ is equal to the first cipher point $(X_C, Y_C, Z_C)$ or one of its equivalent points; and authenticating the user.

In another general aspect, a method to establish a password pw, includes selecting a random salt a; determining a one way hash function where $x=H(a, pw)$; determining a password verifier $(X_v, Y_v, Z_v)$ by scalar multiplication of x with a base point $(X_B, Y_B, Z_B)$; and storing $(X_v, Y_v, Z_v)$ and a as the password verifier and salt, wherein p is a large prime number and $(X_B, Y_B, Z_B)$ is an elliptic curve point defined over a selected elliptic curve in projective coordinates defined over p.

In another general aspect, a method to authenticate the identity of a first device by a second device where p is a large prime number and $(X_B, Y_B, Z_B)$ is an elliptic curve point defined over a selected elliptic curve in projective coordinates defined over p includes sending an identifier of the first device to the second device; retrieving by the second device a stored password verifier $(X_v, Y_v, Z_v)$ and corresponding salt a of the first device; sending a to the first device from the second device; determining a long-term private key x of the first device using a one way hash function of a and the password pw; generating by the first a random number u, where $1<u<p$, determining by the first device a first ephemeral public key $(X_U, Y_U, Z_U)$ by scalar multiplication of u and the based point $(X_B, Y_B, Z_B)$; sending the first key embedded in X coordinate $X_U$ and the Z coordinate $Z_U$ from the first device to the second device. The second device generates its own random number s, $1<s<p$, computes a second ephemeral public key $(X_S, Y_S, Z_S)=(X_v, Y_v, Z_v)+s(X_B, Y_B, Z_B)$, and sends the second key back to first device with a randomly generated parameter t. The first device and second device computes the common exponential value $(X_{SU}, Y_{SU}, Z_{SU})$ using the values available to each device wherein if the password pw matches the password used to generate $(X_v, Y_v, Z_v)$, then both values of $(X_{SU}, Y_{SU}, Z_{SU})$ match.

The first and second devices hash $X_{SU}$, and $Z_{SU}$ into a session key K, the first device sends the second device M[1] to indicated that it has the correct session key, and the second device determines M[1] itself to verify that it matches the value for M[1] sent by the first device where M[1]=H($X_U, Z_U, X_S, Z_S, \overline{K}$). The second device sends the first device M[2] to indicate that the second device also has the correct session key, the first device verifies M[2] itself, accepting only if it matches the second devices value for M[2], and both the first and second devices agree on the session key $(X_{SU}, Y_{SU}, Z_{SU})$ where M[2]=H($X_U, Z_U$, M[1], K). K may then be used to encrypt subsequent session traffic between the first and second devices.

One advantage of using the XZ-Elliptic curve cryptography described herein is that the number of points that satisfy an elliptic curve equation in projective coordinates defined over F(p) (and which can be used in a corresponding cryptosystem) is proportional to $p^2$ rather than p. As a result, XZ-Elliptic curve cryptography based password protocols may be used to increase security by maintaining the same order of the underlying finite filed, to reduce complexity for the same security by reducing order of the underlying finite filed, and/or to reach a compromise between these two.

Other features will be apparent from the description, the drawings, and the claims.

DESCRIPTION OF DRAWINGS

Like reference symbols in the various drawings indicate like elements.

DETAILED DESCRIPTION

Overview

Elliptic Curves & Cryptography

Figure 1:
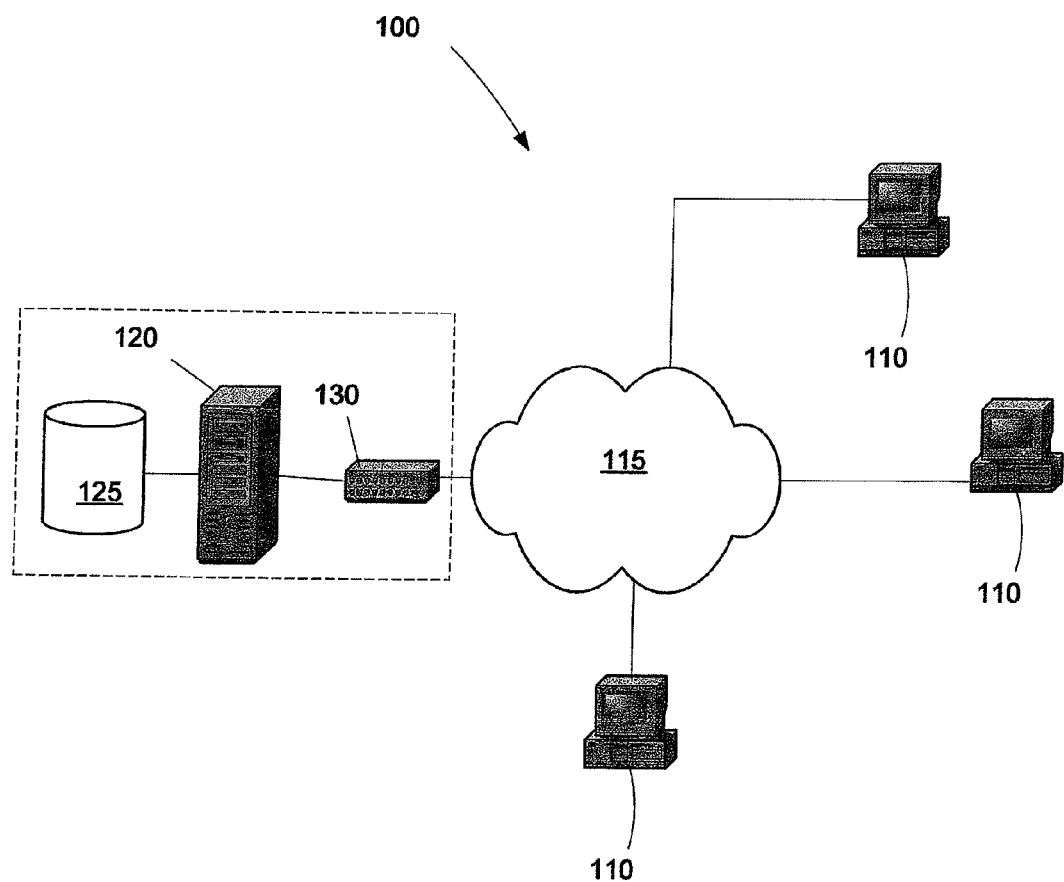
FIG. 1 shows an exemplary communications network.

The groups referred to above derive from the set of finite fields. Elliptic curve cryptography is an improvement over finite-field based public-key cryptography. Methods for adapting discrete-logarithm based algorithms to the set of elliptic curves are known; however, finding discrete logarithms for elliptic curves is particularly difficult. As a result, elliptic curve-based crypto algorithms may be implemented using much smaller numbers than in the set of finite-fields of comparable cryptographic strength.

An elliptic curve group over Fields F(p) may be formed by choosing a pair of a and b coefficients, which are elements within F(p). The group consists of a finite set of points P(x, y) which satisfy the elliptic curve equation:

$$F(x,y) = y^2 - x^3 - ax - b = 0 \qquad 1.1$$

together with a point at infinity, O. The coordinates of the point x and y, are elements of F(p) represented in N-bit strings. A point is either written as a capital letter, for example, P, or as a pair in terms of the affine coordinates, that is (x, y).

An elliptic curve cryptosystem relies upon the difficulty of the elliptic curve discrete logarithm problem (ECDLP) to provide an effective cryptosystem. Using multiplicative notation, the problem can be described as: given points B and Q in the group, find a number k such that $B^k = Q$; where k is called the discrete logarithm of Q to the base B. Using additive notation, the problem becomes: given two points B and Q in the group, find a number k such that kB=Q.

In an elliptic curve cryptosystem, the large integer k is kept private and is often referred to as the secret key. The point Q together with the base point B are made public and are referred to as the public key. The security of the system relies upon the difficulty of deriving the secret k, knowing the public points B and Q. The primary factor that determines the security strength of such a system is the size of its underlying finite field. In a real cryptographic application, the underlying field is made so large that it is computationally infeasible to determine k by computing all multiples of B until Q is found.

At the core of the elliptic curve geometric arithmetic is an operation called scalar multiplication that computes kB by adding together k copies of the point B. Scalar multiplication may be performed through a combination of point-doubling and point-addition operations. The point-addition operation adds two distinct points together; the point-doubling operation adds two copies of a point together. For example, computing 11 B=(2*(2*(2B)))+3B=Q would take three point-doublings and one point-addition.

Addition of two points on an elliptic curve may be calculated as follows. A straight line drawn through two points intersects an elliptic curve at a third point. The point symmetric to the third point with respect to the x-axis is defined as a point resulting from the addition.

Doubling a point on an elliptic curve may be calculated as follows. A tangent line drawn at a point on an elliptic curve intersects the elliptic curve at another point. The point symmetric to the intersecting point with respect to the x-axis is defined as a point resulting from the doubling.

Table 1 illustrates the addition rules for adding two points $(x_1, y_1)$ and $(x_2, y_2)$, that is, $$(x_3, y_3) = (x_1, y_1) + (x_2, y_2) \qquad 1.2$$

TABLE 1

| Summary of Addition Rules: $(x_3, y_3) = (x_1, y_1) + (x_2, y_2)$ | |
|---|---|
| General Equations | $x_3 = m^2 - x_2 - x_1$ <br> $y_3 = m(x_3 - x_1) + y_1$ |
| Point Addition | $m = \dfrac{y_2 - y_1}{x_2 - x_1}$ |
| Point Doubling $(x_3, y_3) = 2(x_1, y_1)$ | $m = \dfrac{3x_1^2 - a}{2y_1}$ |
| $(x_2, y_2) = -(x_1, y_1)$ | $(x_3, y_3) = (x_1, y_1) + (-(x_1, y_1)) = O$ |
| $(x_2, y_2) = O$ | $(x_3, y_3) = (x_1, y_1) + O = (x_1, y_1) = (x_1, -y_1)$ |
| $-(x_1, y_1)$ | |

Overview of Elliptic Curve Encryption and Decryption

Given a message point $(x_m, y_m)$, a base point $(x_B, y_B)$, and a given key, k, the cipher point $(x_C, y_C)$ is obtained using the following equation:

$$(x_C, y_C) = (x_m, y_m) + k(x_B, y_B) \qquad 1.3$$

There are two basics steps in the computation of the above equations. The first step is to find the scalar multiplication of the base point with the key, "k($x_B$, $y_B$)". The second adds the resulting point to the message point ($x_m$, $y_m$) to obtain the cipher point. Conversely, the message point is recovered at the receiver from the cipher point which is usually transmitted with, the shared key and the base point, that is:

$$(x_m, y_m) = (x_C, y_C) - k(x_B, y_B) \quad 1.4$$

Embedding Message Data on Elliptic Curve Points

As indicated earlier, the x-coordinate, $x_m$, is represented as an N-bit string. Not all of the N-bits are used to carry information about the data of the secret message. Assume that the number of bits of the x-coordinate, $x_m$, that do not carry data is L. The extra bits, L, are used to ensure that message data embedded into the x-coordinate provides an $x_m$ value that satisfies the elliptic curve equation, as first proposed in "N. Kobltiz, Introduction to Elliptic Curve and Modular Forms, New York: Springer-Verlag 1993".

It has been reported that the number of iterations needed to find such a value vary from two to thirteen iterations. It also has been reported that if a first guess of $x_m$ is not on a curve, then a second or third try usually is, although this does not guarantee that a solution will be found in two to three iterations. Therefore, the number of bits used to carry the message data is (N−L). Assuming that the secret data is an M-bit string, the number of elliptic curve points needed to encrypt the K-bit data is $$\left\lceil \frac{K}{N-L} \right\rceil.$$

It is important to note that the y-coordinate, $y_m$, of the message point carries no data bits.

Attacks

The difficulty in solving the elliptic curve discrete logarithm problem has been established theoretically. However, there is a possibility that information associated with secret information, such as, for example, the private key, may be determined during cryptographic processing of real applications. For example, an attack method using power analysis has been proposed that decrypts the secret information based on the information derived from the cryptographic processing.

One example of an attack method is differential power analysis (DPA) that measures changes in voltage in cryptographic processing of secret information to obtain the cryptographic process and infer the secret information on the basis of the obtained process. A DPA is disclosed in P. Kocher, J. Jaffe and B. Jun Differential Power Analysis, Advances in Cryptology: Proceedings of CRYPTO '99, LNCS 1666, Springer-Verlag, (1999) pp. 388-397.

An elliptic curve cryptosystem to which the above-mentioned attack method is applied is disclosed by J. Coron, in Resistance against Differential Power Analysis for Elliptic Curve Cryptosystems, Cryptographic Hardware and Embedded Systems: Proceedings of CHES '99, LNCS 1717, Springer-Verlag, (1999) pp. 292-302. In the elliptic curve cryptosystem, encryption, decryption, signature generation, and signature verification of a given message are carried out with elliptic curve operations. In particular, calculation of scalar multiplication on an elliptic curve is used in cryptographic processing using a scalar value as the secret information.

A method using randomized projective coordinates is one of the countermeasures to DPA attack on elliptic curve cryptosystems. This method protects against observing whether or not a specific value appears in a scalar multiplication calculation and inferring a scalar value from the observed result. In other words, the inferring a specific value is prevented by multiplication with a random value.

Conventional elliptic curve cryptosystems have not accounted for attack by power analysis, such as DPA. As a result, additional calculations have to be carried out during the cryptographic processing of secret information to prevent attack by power analysis. This may be accomplished by weakening any correlation between the cryptographic process and the secret information. However, the additional time required for cryptographic processing significantly lowers the efficiency of a computer with slow calculation speeds, such as an IC card, or a server managing an enormous number of cryptographic processes. In addition, the correlation between the cryptographic processing and the secret information cannot be entirely eliminated. On the other hand, if priority is given to the cryptographic processing efficiency, the cryptosystem may be susceptible to power analysis attack and the possibility that secret information is discovered Speed of Computations With the development of communication networks, cryptographic techniques for concealing or authenticating electronic information have been indispensable. However, increased processing speeding is demanded in addition to the security of various cryptographic techniques. Because of the complexity of the elliptic curve discrete logarithm problem, elliptic curve cryptosystems may use a relatively shorter key length than conventional RSA (Rivest-Shamir-Adleman) cryptosystems which base their level of security on the difficulty of factorization into prime factors. As a result, elliptic curve cryptosystems have promise to open the way to comparatively high-speed cryptographic processing. However, the increased processing speed of elliptic curve cryptosystems is not always great enough to satisfy the limitations of certain smart cards that have restricted throughput or servers that perform large volumes of cryptographic processing. Therefore, additional processing speed in cryptosystems is needed.

The two equations to determine "m" in Table 1 are called slope equations. Computation of a slope equation using integer fields requires one modular integer division. Alternatively, the slope computation may be computed using one modular integer inversion and one modular integer multiplication. Modular integer division and modular integer inversion are computationally intensive because they require extensive CPU cycles to manipulate two large integers modular a large prime number. It is commonly accepted that a point-doubling and a point-addition operation each require one inversion, two multiplications, a square, and several addition calculations. To date there are techniques to compute modular integer division and modular integer inversion, and techniques to trade computationally intensive inversions for multiplications by performing the operations in projective coordinates.

In cases where field inversions are significantly more computationally intensive than multiplication, it is more efficient to implement projective coordinates. For example, an elliptic curve projective point (X, Y, Z) in conventional projective (or homogeneous) coordinates satisfies the homogeneous Weierstrass equation:

$$\tilde{F}(X, Y, Z) = Y^2 Z - X^3 - aXZ^2 - bZ^3 = 0 \quad 1.5$$

and, when Z≠0, the elliptic curve projective point corresponds to the affine point $$(x, y) = \left(\frac{X}{Z}, \frac{Y}{Z}\right).$$

Other projective representations may provide even more efficient implementations of the group operation (e.g., as indicated by D. V. Chudnovsky and G. V. Chudnovsky, Sequences of numbers generated by addition in formal groups and new primality and factorization tests, Adv. In Appli. Math. Vol. 7, 1987, pp 385-434) or, for example, the Jacobian representations where the triplets (X, Y, Z) correspond to the affine coordinates $$(x, y) = \left(\frac{X}{Z^2}, \frac{Y}{Z^3}\right)$$

whenever $Z \neq 0$. This is equivalent to using Jacobian elliptic curve equation that is of the form:

$$\tilde{F}_J(X,Y,Z) = Y^2 - X^3 - aXZ^4 - bZ^6 = 0 \qquad 1.6$$

Another commonly used projection is the Chudnovsky-Jacobian coordinates.

In general terms, the relationship between the affine coordinates and the projection coordinates may be expressed $$(x, y) = \left(\frac{X}{Z^i}, \frac{Y}{Z^j}\right)$$

where the values of i and j depend on the choice of the projective coordinates, for example, for homogeneous coordinates, i=1 and j=1.

It is important to note that the group addition rules are defined in the affine coordinates and not in any of the projective coordinates, that is:

$$\left(\frac{X_3}{Z_3^i}, \frac{Y_3}{Z_3^j}\right) = \left(\frac{X_1}{Z_1^i}, \frac{Y_1}{Z_1^j}\right) + \left(\frac{X_2}{Z_2^i}, \frac{Y_2}{Z_2^j}\right) \qquad 1.7$$

In other words, the computation of the coordinate values of $X_3$, $Y_3$ and $Z_3$ are based on the equations in Table 1, whereby the value of $Z_3$ is chosen from the denominator of the equations in Table 1 in order to remove the division operations from the calculations of $X_3$ and $Y_3$ This implies that $$\left(\frac{X_1}{Z_1^i}, \frac{Y_1}{Z_1^j}\right), \left(\frac{X_2}{Z_2^i}, \frac{Y_2}{Z_2^j}\right) \text{ and } \left(\frac{X_3}{Z_3^i}, \frac{Y_3}{Z_3^j}\right)$$

lie on the same straight line, while $(X_1, Y_1, Z_1)$, $(X_2, Y_2, Z_2)$ and $(X_3, -Y_3, Z_3)$ do not lie on the same line.

This implies that one cannot write:

$$(X_3, Y_3, Z_3) = (X_1, Y_1, Z_1) + (X_2, Y_2, Z_2)$$

when the addition, +, is defined over the affine coordinate.

It should be noted that defining the elliptic curve points as a group over addition is necessary so that equation 1.7 can be re-written as:

$$\left(\frac{X_2}{Z_2^i}, \frac{Y_2}{Z_2^j}\right) = \left(\frac{X_3}{Z_3^i}, \frac{Y_3}{Z_3^j}\right) - \left(\frac{X_1}{Z_1^i}, \frac{Y_1}{Z_1^j}\right)$$

It is this group definition, which leads to the fact that decryption, which is described in equation 1.4, is in fact the reciprocal of encryption as defined in equation 1.3.

The use of projective coordinates circumvents the need for division in the computation of each point addition and point doubling during the calculation of scalar multiplication. Therefore, integer modular division may be avoided in the calculation of scalar multiplication, $$k\left(\frac{X_B}{Z_B^i}, \frac{Y_B}{Z_B^j}\right)$$

when using projective coordinates.

The last addition for the computation of the cipher point, $$\left(\frac{X_C}{Z_C^i}, \frac{Y_C}{Z_C^j}\right),$$

i.e., the addition of the two points $$\left(\frac{X_m}{Z_m^i}, \frac{Y_m}{Z_m^j}\right) \text{ and } k\left(\frac{X_B}{Z_B^i}, \frac{Y_B}{Z_B^j}\right)$$

also may be carried out in the chosen projection coordinate, that is:

$$\left(\frac{X_C}{Z_C^i}, \frac{Y_C}{Z_C^j}\right) = \left(\frac{X_m}{Z_m^i}, \frac{Y_{m1}}{Z_m^j}\right) + \left(\frac{X_B}{Z_B^i}, \frac{Y_B}{Z_B^j}\right)$$

It should be pointed out that $Z_m = 1$.

However, one division (or one inversion and one multiplication) is needed to calculate $$x_C = \frac{X_C}{Z_C^i},$$

since only the affine x-coordinate of the cipher point, $x_C$, is transmitted by the sender.

Therefore, the encryption of (N–L) bits of the secret message using elliptic curve encryption requires at least one division when using projective coordinates. Similarly, the decryption of a single message encrypted using elliptic curve cryptography also requires at least one division when using projective coordinates.

Password Protocol and Public-key Cryptography:

Password protocols are used in applications where a server needs to authenticate the identity of a remote user or client device. Password protocols differ from asymmetric cryptography because password protocols are used to authenticate identities and not facilitate private communications. Password protocols differ from public key cryptography since password protocols do not necessarily need independent certification of a server's public key.

Public Key-based password protocols have been proposed by "S. Halevi and H. Krawczyk, Public key cryptography and password protocols, ACM Transactions on Information and System Security, Vol. 2, No. 3, August 1999". Using public Key-based password protocols, the identity of a remote user is authenticated by using a human-recognizable password. A server stores a file containing the passwords of users or an image of the password under a one-way function as well as other information that could help in the authentication of a remote user.

In password protocol, the user's password is the only secret available to the client software. It is assumed that the network connecting the client device to the server is vulnerable to both eavesdropping and deliberate tampering by others. It also is assumed that no trusted third party, such as a key server or arbitrator, can be used; only the client and the server may engage in the authentication protocol. These password protocols have a surprisingly wide range of practical applications because they do not require anything more than providing a password, making them much easier to use and less expensive to deploy than either biometric or token-based methods. One obvious application for password protocols is handling remote, password-protected computer access. It is worth noting that most conventional Internet protocols employ plain-text passwords for user authentication.

One example of a password protocol is the Secure Remote Password (SRP) Protocol being considered by the IEEE P1363 working group (http://grouper.ieee.org/groups/1363/) as a possible standard for remote user access based on a password protocol. This password protocol requires a shared secret key.

The following is a description of the SRP authentication process from beginning to end, starting with password setup (as stated in a submission by Thomas Wu to the IEEE P1363 working group). A full copy of the document may be found using the following url (http://grouper.ieee.org/goups/1363/). The document also includes a review of the state of the art.

TABLE 1.2

Mathematical Notation for SRP

| | |
|---|---|
| n | A large prime number. All computations are performed modulo n. |
| g | A primitive root modulo n (often called a generator) |
| s | A random string used as the user's salt |
| P | The user's password |
| x | A private key derived from the password and salt |
| v | The host's password verifier |
| u | Random scrambling parameter, publicly revealed |
| a, b | Ephemeral private keys, generated randomly and not publicly revealed |
| A, B | Corresponding public keys |
| H( ) | One-way hash function |
| m, n | The two quantities (strings) m and n concatenated |
| K | Session key |

Table 1.2 shows the notation used in this section. The values n and g are well-known values used in this context.

In this example, Steve and Carol wish to establish a password. To establish a password P with Steve, Carol picks a random salt s, and computes:

$$x = H(s, P)$$

$$v = g^x$$

Steve stores v and s as Carol's password verifier and salt. Remember that the computation of v implicitly reduced modulo n. x is discarded because it is equivalent to the plain-text password P.

The AKE protocol also allows Steve to have a password z with a corresponding public key held by Carol; in SRP, z is set to 0 and therefore drops out of the equations. Since this private key is 0, the corresponding public key is 1. Consequently, instead of safeguarding its own password z, Steve needs only to keep Carol's verifier v secret to assure mutual authentication. This frees Carol from having to remember Steve's public key and simplifies the protocol.

To authenticate, Carol and Steve engage in the protocol described in Table 1.3. A description of each step follows:

TABLE 1.3

The Secure Remote Password Protocol

| | Carol | | Steve |
|---|---|---|---|
| 1. | | C --> | (lookup s, v) |
| 2. | $x = H(s, P)$ | <-- s | |
| 3. | $A = g^a$ | A --> | |
| 4. | | <-- B, u | $B = v + g^b$ |
| 5. | $S = (B - g^x)^{(a+ux)}$ | | $S = (A \cdot v^u)^b$ |
| 6. | $K = H(S)$ | | $K = H(S)$ |
| 7. | $M[1] = H(A, B, K)$ | M[1] --> | (verify M[1]) |
| 8. | (verify M[2]) | <-- M[2] | $M[2] = H(A, M[1], K)$ |

1. Carol sends her username, (e.g. carol) to Steve.
2. Steve looks up Carol's password entry and fetches her password verifier v and her salt s. He sends s to Carol. Carol computes her long-term private key x using s and her real password P.
3. Carol generates a random number a, 1<a<n, computes her ephemeral public key $A = g^a$, and sends it to Steve.
4. Steve generates his own random number b, 1<b<n, computes his ephemeral public key $B = v + g^b$, and sends it back to Carol, along with the randomly generated parameter u.
5. Carol and Steve compute the common exponential value $S = g^{(ab+bux)}$ using the values available to each of them. If Carol's password P entered in Step 2 matches the one she originally used to generate v, then both values of S will match.
6. Both sides hash the exponential S into a cryptographically strong session key.
7. Carol sends Steve M[1] as evidence that she has the correct session key. Steve computes M[1] himself and verifies that it matches what Carol sent him.
8. Steve sends Carol M[2] as evidence that he also has the correct session key. Carol also verifies M[2] herself, accepting it only if it matches Steve's value.

Both sides agree on the session key $S = g^{(ab+bux)}$ if all steps are executed correctly. SRP also adds the two flows at the end to verify session key agreement using a one-way hash function. Once the protocol run is successfully completed, both parties may use S to encrypt subsequent session traffic.

Exemplary Communications System

As shown by the exemplary architecture illustrated FIG. 1, a communications system 100 may include a host device 101 connected to client devices 110 using a communications channel or path 115 to provide network online services, content, and resources to the one or more client devices 110 and their users.

The client devices 110 may be operated by one or more users to access the host device or other client devices 110. An example of a client device 110 is a general-purpose computer capable of responding to and executing instructions in a defined manner. Client devices 110 also may include a special-purpose computer, a processor, a microprocessor, a microcomputer, a personal computer ("PC"), a workstation, a mainframe, a server, a laptop, a mobile communications device/phone, a personal digital assistant ("PDA"), an interactive television set, a set top box, an on-board (i.e., vehicle-mounted) computer, or a combination of two or more of these devices capable of responding to, generating, and/or executing instructions. The client device 110 may include any number of other devices, components, and/or peripherals, such as additional computing devices, memory/storage devices, input devices, output devices, user interfaces, and/or communications interfaces.

The client device 110 also may include one or more software applications including, for example, password authentication software loaded on the client device 110 to command and direct the client device 110. Software applications may be implemented as a computer program, a piece of code, an instruction, or some combination thereof, for independently or collectively instructing the client device 110 to interact and operate as desired.

The applications may be embodied permanently or temporarily in any type of machine, component, physical or virtual equipment, storage medium, or propagated signal wave capable of providing instructions to the client device 110. In particular, the applications may be stored on a storage medium or device including volatile and non-volatile (e.g., a read only memory (ROM), a random access memory (RAM), a flash memory, a floppy disk, a hard disk, a tape, a DROM, a flip-flop, a register, an SRAM, DRAM, PROM, EPROM, OPTROM, EEPROM, NOVRAM, or RAMBUS), such that if the storage medium or device is read by the client device 110, the specified steps, processes, and/or instructions are performed.

The client device 110 may also include one or more communications interfaces that allow the client device 110 to send and receive information using the communications paths 115. The communications paths 115 may be configured to send and receive signals (e.g., electrical, electromagnetic, or optical) that convey or carry data streams representing various types of analog and/or digital data. For example, the communications paths 115 may be implemented using various communications media and one or more networks comprising one or more network devices (e.g., servers, routers, switches, hubs, repeaters, and storage devices). The one or more networks may include a local area network (LAN), a wide area network (WAN), a plain old telephone service (POTS) network, a digital subscriber line (DSL) network, an integrated services digital network (ISDN), a synchronous optical network (SONNET), or a combination of two or more of these networks. In addition, the communications paths 115 may include one or more wireless links (e.g., cellular, mobile, GSM, CDMA, TDMA, and satellite) that transmit and receive electromagnetic signals, such as, for example, radio, infrared, and microwave signals, to convey information. Because the communications paths 115 may cover any number of networks and media, generally, they are considered unsecured.

The host device 101 includes a host processing device 120, and storage device 125, and a communications interface 130 that allows the host processing device 120 to exchange data with the client devices 110 using the communications paths 115. The communications interface 130 may be implemented as part of the host processing device 120 or separately. The communications interface 130 may exchange data with the host processing device 120. In addition, the interface 130 may include one or more interfaces, including interfaces for different types of hardware and for different types of communications media and protocols to translate information into a format that may be used by the host processing device 120. Similarly, the interface 130 may translate data/information received from the processing device 120 to a format that may be transmitted to the client devices 110 via a communications path 115.

The host processing device 120 may be implemented using a general-purpose or special purpose computer or processor capable of responding to and executing instructions in a defined manner. The host processing device 120 also may include some combination of one or more processing devices capable of responding to, generating, and/or executing instructions. The host processing device 120 may include any number of other devices, components, and/or peripherals, such as additional computing devices, memory/storage devices, input devices, output devices, user interfaces, and/or communications interfaces. In one implementation, the host processing device 120 may be implemented using one or more servers. The host processing device 120 may communicate with the secure data storage 125.

The host processing device 120 may run one or more software applications to command and direct the host processing device 120. The software applications may include a computer program, a piece of code, an instruction, or some combination thereof, for independently or collectively instructing the host processing device 120 to operate as desired. In particular, the host processing device 120 may include a software application that is run by the host processing device 120, such as, for example, an $EC^3$ elliptic curve cryptography based password protocols that are explained in greater detail below.

The storage device 125 may be implemented using any type of memory including volatile and nonvolatile, for example, as described above. The secure data storage 125 may store any type of data, such as, for example, password data. The storage device 125 may be implemented as an integral part of the host processing device 120, as a separate storage device, and/or as a remote storage device. The storage device 125 may include one or multiple storage devices including one or more storage devices at a remote location.

It will be appreciated by those of skill in the art, that the host device 101 (e.g., a server) may be implemented by a client device 110.

Because users are often located remotely or outside of a secure system, and because communications links 115 also are often not secure, the identity of a user or other entity must be established in a secure way for communications may take place. The system and methods described herein provide remote user authentication using password protocols based on elliptic curve cryptography. More specifically, the process uses the X-coordinate and the Z-coordinate of an elliptic curve when represented in projective coordinates, wherein point addition is defined over a three dimensional space that includes the projective coordinate.

Password protocols based on public key cryptography and a shared secret key are described herein to provide authentication of a remote user over a network or un-secure communications link. Password protocols are different from asymmetric cryptography because password protocols provide authentication of an entity's identity and not private communication between entities. In addition, password protocols are different from public key cryptography, because password protocols do not necessarily need an independent certification of the host server's public key.

The password protocols described below are based on a method of applying projective coordinates in two stages. In the first of the two stages, a projective coordinate is used to embed extra message data bits in the Z coordinate. In the second stage, a projective coordinate is used to reduce the number of iterations of the process and to randomize the computation (to provide a counter measure against differential power analysis).

One advantage of using the XZ-Elliptic curve cryptography described herein is that the number of points that satisfy an elliptic curve equation in projective coordinates defined over F(p) (and which can be used in a corresponding cryptosystem) is proportional to $p^2$ rather than p. As a result, XZ-Elliptic curve cryptography based password protocols may be used to increase security by maintaining the same order of the underlying finite filed, to reduce complexity for the same security by reducing order of the underlying finite filed, and/or to reach a compromise between these two.

Definition of a Set of Elliptic Curve Points Represented in Projective Coordinate as a Group Over Addition It is well known that the symbol $\epsilon$ denote set membership. Given a field F(p), and a & b$\epsilon$F(p), $EC^2$ may be defined as the set of points (x, y) that satisfy the elliptic curve equation in affine coordinate, that is equation 1.1, where x & y$\epsilon$F(p) together with a point at infinity.

It is shown in the above mentioned book by N. Koblitz, that using the addition rules defined above for the set of points $EC^2$, the set $EC^2$ forms an abelian group over addition, ($EC^2$, +).

A new projection (X, Y, Z) is defined here as Ibrahim's projection, which is related to the affine coordinate as follows, $$y = \frac{Y}{Z^{\frac{3}{2}}}$$

$$x = \frac{X}{Z}$$

3.1

Substituting Ibrahim's projection in equation 1.1, Ibrahim's form of the elliptic curve equation is obtained:

$$\tilde{F}(X, Y, Z) = Z^3 F\left(\frac{X}{Z}, \frac{Y}{Z^{\frac{3}{2}}}\right) = Y^2 - X^3 - aXZ^2 - bZ^3 = 0 \quad 3.2$$

Note that if F(x, y) is non-singular, i.e., $4a^2+27b^3 \neq 0$, then $\tilde{F}(X, Y, Z)$ also is non-singular. The following assumes non-singular elliptic curve equations.

The set of points $EC^3$ is defined as the triplets (X, Y, Z), where X, Y & Z$\epsilon$F(p), that satisfy Ibrahim's form of the elliptic curve equation plus a point at infinity $(X_I, Y_I, Z_I)$ and excluding the point at the origin, (0, 0, 0). Note that $EC^3$ is expressed in projective coordinates while $EC^2$ is expressed in affine coordinates.

The addition rules for the group ($EC^2$, +) can be adopted to define an additive binary operation, +, over $EC^3$, that is for all $(X_1, Y_1, Z_1) \epsilon EC^3$ and $(X_2, Y_2, Z_2) \epsilon EC^3$, the sum:

$$(X_3, Y_3, Z_3) = (X_1, Y_1, Z_1) + (X_2, Y_2, Z_2) \quad 3.3$$

is also $(X_3, Y_3, Z_3) \epsilon EC^3$.

It is shown that ($EC^3$, +) forms a pseudo-group (p-group) over addition that satisfies the following axioms:
 (i) There exists $(X_I, Y_I, Z_I) \epsilon EC^3$ such that $(X, Y, Z) + (X_I, Y_I, Z_I) = (X, Y, Z)$ for all $(X, Y, Z) \epsilon EC(K^3)$;
 (ii) For every $(X, Y, Z) \epsilon EC^3$ there exists $-(X, Y, Z) \epsilon EC^3$ such that $(X, Y, Z) - (X, Y, Z) = (X_I, Y_I, Z_I)$;
 (iii) the additive binary operation in ($EC^3$, +) is commutative; and
 (iv) the p-group ($EC^3$, +) forms a group over addition when:
 the additive binary operation in ($EC^3$, +) is associative.

Definition of the Rules for Addition Rules for the Group ($EC^3$, +)

Addition of two points on an elliptic curve in projective coordinate, $EC^3$, may be calculated as follows. When a straight line is drawn through two points of $EC^3$, the straight line intersects the elliptic curve at a projective coordinate at a third point. The point symmetric to this third intersecting point with respect to the X-axis is defined as a point resulting from the addition.

A straight-line equation in projective coordinates may be expressed as:

$$\frac{X - X_1}{X_2 - X_1} = \frac{Y - Y_1}{Y_2 - Y_1} = \frac{Z - Z_1}{Z_2 - Z_1} \quad 3.4$$

A basic rule may be formulated as follows: draw the line that joins the two points to be added in the set $EC^3$. Denoting the third point of intersection as $(X'_3, Y'_3, Z'_3)$, the sum point is defined as $(X_3, Y_3, Z_3) = (X'_3, -Y'_3, Z'_3)$.

It follows from the above definition that the addition over $EC^3$ is commutative, i.e., $(X_1, Y_1, Z_1) + (X_2, Y_2, Z_2) = (X_2, Y_2, Z_2) + (X_1, Y_1, Z_1)$ for all $(X_1, Y_1, Z_1) \epsilon E(K^3)$, $(X_2, Y_2, Z_2) \epsilon E(K^3)$. This satisfies the third axiom (iii) given above.

There are four main cases A, B, C, and D that are considered for the computation of addition for ($EC^3$, +) which may be expressed as:

| | |
|---|---|
| $X_1 \neq X_2$ | A. |
| $X_1 = X_2$ & $Z_1 \neq Z_2$ | B. |
| $(X_1, Y_1, Z_1) = (X_2, Y_2, Z_2)$ (point doubling) | C. |
| $X_1 = X_2$ & $Z_1 = Z_2$ | D. |

Case A:
In Case A where $X_1 \neq X_2$, one can write, $$Y'_3 = Y_1 + m_y(X'_3 - X_1) \quad 3.5$$

and $$Z'_3 = Z_1 + m_z(X'_3 - X_1) \quad 3.6$$

where $$m_y = \frac{Y_2 - Y_1}{X_2 - X_1} \quad 3.7$$

and $$m_z = \frac{Z_2 - Z_1}{X_2 - X_1} \quad 3.8$$

Substituting equation 3.5 for $Y'_3$ and equation 3.6 for $Z'_3$ in Ibrahim's form of the elliptic curve equation (i.e., equation 3.2) the follow expression is obtained:

$$(Y_1+m_y(X-X_1))^2 - X^3 - aX(Z_1+m_z(X-X_1))^2 - b(Z_1+m_z(X-X_1))^3 = 0 \quad 3.9$$

Expanding the terms between brackets and grouping the terms with the same powers of X, the following is obtained:

$X^3 + am_z^2X^3 + bm_z^3X^3 - m_y^2X^2 + 2am_zZ_1X^2 - 2am_z^2X^2X_1 + bm_z^2Z_1X^2 + 2bm_z^2Z_1X^2 - 2bm_z^3X^2X_1 - bm_z^3X^2X_1 - 2m_yY_1X + 2m_y^2XX_1 + aXZ_1^2 - 2am_zZ_1XX_1 + am_z^2XX_1^2 + 2bm_zZ_1^2X - 2XX_1bm_z^2Z_1 + bm_zXZ_1^2 -$ $$4bm_z^2 Z_1 XX_1 + bm_z^3 XX_1^2 + 2bm_z^3 XX_1^2 - Y_1^2 +$$
$$2m_y Y_1 X_1 - m_y^2 X_1^2 + bZ_1^3 - 2bm_z^2 Z_1^2 X_1 + bX_1^2 m_z^2 Z_1 -$$
$$bm_z^2 X_1 Z_1^2 + 2bm_z^2 Z_1 X_1^2 - bm_z^3 X_1^3 = 0 \quad 3.10$$

It is understood that any cubic equation has three roots:

$$(X-X_1)(X-X_2)(X-X'_3)=0. \quad 3.11$$

Scaling the coefficient of the term $X^3$ to 1 in equation 3.10, and equating the coefficient of the term $X^2$ in equations 3.10 and 3.11, the following is obtained:

$$X'_3 = \frac{1}{c}(m_y^2 - 2am_z Z_1 + 2am_z^2 X_1 - 3bm_z^2 Z_1 + 3bm_z^3 X_1) - X_1 - X_2 \quad 3.12$$

or $$X'_3 = \frac{1}{c}(m_y^2 - (2a + 3bm_z)m_z Z_1 + (2a + 3bm_z)m_z^2 X_1) - X_1 - X_2 \quad 3.13$$

and after grouping terms to reduce the number of computations, the following is obtained:

$$X'_3 = \frac{1}{c}(m_y^2 - m_z(2a + 3bm_z)(Z_1 - m_z X_1)) - X_1 - X_2 \quad 3.14$$

where, $$c = 1 + am_z^2 + bm_z^3 \quad 3.15$$

Substituting for the solution of $X'_3$, which is given in equation 3.14, in equation 3.5, the solution for $Y'_3$ is obtained. Similarly, substituting for the solution of $X'_3$, which is given in equation 3.14, in equation 3.6, the solution for $Z'_3$ is obtained.

Case B:

In Case B $X_1 = X_2$ and $Z_1 \neq Z_2$. Letting $X_o = X_1 = X_2$, $X_3 = X_1 = X_2 = X_o$, because the straight line is in the YZ-plane $X_o$.
Therefore:

$$Y'_3 = Y_1 + n_y(Z'_3 - Z_1) \quad 3.16$$

where $$n_y = \frac{Y_2 - Y_1}{Z_2 - Z_1}$$

Substituting equation 3.16 for $Y'_3$ in Ibrahim's form of the elliptic curve equation, (i.e., equation 3.2), and noting that $X = X_o$, the following equation is obtained $$(Y_1 + n_y(Z - Z_1))^2 - X_o^3 - aX_o Z^2 - bZ^3 = 0 \quad 3.17$$

Expanding the terms between brackets and grouping the terms with the same powers of Z, the following equation is obtained:

$$Z^3 - \frac{1}{b}(n_y^2 Z^2 - aX_o Z^2) +$$
$$\frac{1}{b}(2n_y Y_1 Z - 2n_y^2 Z Z_1 + Y_1^2 - 2n_y Y_1 Z_1 + n_y^2 Z_1^2 - X_o^3) = 0 \quad 3.18$$

As previously noted, any cubic equation has three roots:

$$(Z-Z_1)(Z-Z_2)(Z-Z'_3)=0 \quad 3.19$$

Equating the coefficient of the term $Z^2$ in equations 3.18 and 3.19, the following equation is obtained:

$$Z'_3 = \frac{1}{b}(n_y^2 - aX_o) - Z_1 - Z_2 \quad 3.20$$

Substituting for the solution of $Z'_3$, which is given in equation 3.20, in equation 3.16 the solution for $Y'_3$ is obtained.

Case C:

In case C, or the point doubling case, $(X_1, Y_1, Z_1) = (X_2, Y_2, Z_2)$. Let $(X_o, Y_o, Z_o) = (X_1, Y_1, Z_1) = (X_2, Y_2, Z_2)$, that is, $(X_3, Y_3, Z_3) = 2(X_o, Y_o, Z_o)$ Doubling a point on an elliptic curve in projective coordinates may be defined in several ways as shown in the following examples.

C.1 When a tangent line in the XY-plane is drawn at a point on an elliptic curve, the tangent line intersects the elliptic curve in the projective coordinate, $EC^3$, at another point. The point symmetric to this intersecting point with respect to the X-axis is defined as a point resulting from the doubling. Note that in this case $Z'_3 = Z_o$.

C.2 When a tangent line in the YZ-plane is drawn at a point on an elliptic curve, the tangent line intersects the elliptic curve in the projective coordinate, $EC^3$, at another point. The point symmetric to this intersecting point with respect to the X-axis is defined as a point resulting from the doubling. Note that in this case $X'_3 = X_o$.

C.3 Some form of a combination of rules/gradients in C.1 and C.2 above. The simplest is to perform doubling using rule C.1 followed by another doubling using rule C.2. Another is to use the gradients in C.1 and C.2 simultaneously.

The following considers case C.1 and case C.2 only.

Case C.1: In this case, $Z_3 = Z_1 = Z_2 = Z_o$. The gradient of the tangent of the point $(X_o, Y_o, Z_o)$ of the elliptic curve in projective coordinates in a XY-plane is given by, $$\frac{dY}{dX} = \frac{3X_o^2 + aZ_o^2}{2Y_o} = m_y \quad 3.21$$

Substituting equation 3.21 for $m_y$ in equation 3.14, and noting that $m_z = 0$ in this case, a solution for $X'_3$ is obtained:

$$X'_3 = m_y^2 - X_1 - X_2 \quad 3.22$$

Substituting for the solution of $X'_3$, which is given in equation 3.22, in equation 3.5 the solution for $Y'_3$ is obtained.

Case C.2: In this case, $X_3 = X_1 = X_2 = X_o$. The gradient of the tangent of the point $(X_o, Y_o, Z_o)$ of the elliptic curve in projective coordinates in a YZ-plane is given by, $$\frac{dY}{dZ} = \frac{2aX_o Z_o + 3bZ_o^2}{2Y_o} = n_y \quad 3.23$$

Substituting equation 3.23 for $n_y$ in equation 3.20 a solution for $Z'_3$ is obtained:

$$Z'_3 = \frac{1}{b}(n_y^2 - aX_o) - Z_1 - Z_2 \quad 3.24$$

Substituting for the solution of $Z'_3$, which is given in equation 3.24, in equation 3.16 the solution for $Y'_3$ is obtained.

Case D

In case D, $X_1 = X_2$ and $Z_1 = Z_2$. Let $X_o = X_1 = X_2$ and $Z_o = Z_1 = Z_2$. If these values are directly substituted in the Ibrahim form of the elliptic curve equation, (i.e., equation 3.2), a quadratic equation for the Y-coordinate is obtained:

$$Y^2 = X_o^3 + aX_o Z_o^2 + bZ_o^3 \quad\quad 3.25$$

Denoting $Y_o$ as one of the solutions, the other solution is $-Y_o$. Therefore, a line perpendicular to the XZ-plane intersects $EC^3$ at only two points $(X, Y, Z)$ and $(X, -Y, Z) \in EC^3$, and shows the symmetry of $EC^3$ about the plane defined by $Y=0$. Furthermore, every $(X, Y, Z) \in EC^3$ has a unique mirror image point $(X, -Y, Z) \in EC^3$. Now, since a line joining such pairs $(X, Y, Z)$ and $(X, -Y, Z) \in EC^3$ does not intersect with $EC^3$ at a third finite point, such lines are assumed to intersect with $EC^3$ at the point of infinity $(X_I, Y_I, Z_I)$. This point at infinity is used to define both the inverse of a point in $EC^3$ and the identity point. According to the addition rule defined in section 3.1, one can write:

$$(X,Y,Z) + (X,-Y,Z) = (X_I, Y_I, Z_I) \quad\quad 3.26$$

since the third point of intersection of such lines is the point at infinity. This equation therefore defines a unique inverse for any point: $(X, Y, Z) \in EC^3$, $$-(X,Y,Z) = (X,-Y,Z) \quad\quad 3.27$$

Therefore equation 3.26 can be written as:

$$(X,Y,Z) - (X,Y,Z) = (X_I, Y_I, Z_I) \quad\quad 3.28$$

A line joining the point at infinity and any point $(X, Y, Z) \in EC^3$ will intersect with $EC^3$ at $(X, -Y, Z)$. Therefore from the addition rule defined in section 3.1, one can also write, $$(X,Y,Z) + (X_I, Y_I, Z_I) = (X,Y,Z) \quad\quad 3.29$$

Equation 3.28 satisfies the second axiom (ii) while equation 3.29 satisfies first axiom (i) of the Group $(EC^3, +)$.

Associativity of $EC^3$:

One way of proving Associativity of $(EC^3, +)$ is as follows. Given particular elliptic polynomial equations (i.e., for particular coefficient's "a & b" and finite filed $F(p)$), if it can be shown by algebra, computations or through other means that $(Q+(R+S))=((Q+R)+S)$ for any three points $Q, R, S \in EC^3$, the corresponding $(EC^3, +)$ is associative.

Second Projective Coordinate

Each of the equations for point addition and point doublings derived for the cases A, B, and C require one modular inversion or division. In cases where field inversions or divisions are significantly more expensive than multiplication, a second projective coordinate is used to remove the requirement for field inversion or division from these equations. As shown below, the numbers of operations needed for $EC^3$ point doubling and point additions when performed in the second projective coordinate are comparable to those needed in $EC^2$.

Several projective coordinates can be used. In this invention, the homogenous projection is used as an example:

$$X = \frac{X}{V} \quad\quad 4.1.a$$

$$Y = \frac{Y}{V} \quad\quad 4.1.b$$

$$Z = \frac{Z}{V} \quad\quad 4.1.c$$

Using this projection in the Ibrahim's form of the elliptic curve equation, (i.e., equation 3.2), one obtains the Homogenous-Ibrahim elliptic curve equation:

$$\tilde{F}(X, Y, Z, V) = V\tilde{F}\left(\frac{X}{V}, \frac{Y}{V}, \frac{Z}{V}\right) \quad\quad 4.2$$
$$= Y^2 V - X^3 - aXZ^2 - bZ^3$$
$$= 0$$

An elliptic curve projective point $(X, Y, Z, V)$ using Homogenous-Ibrahim projective coordinates satisfies the Homogenous-Ibrahim elliptic curve equation, equation 4.2. When $V \neq 0$, the Homogenous projected point $(X, Y, Z, V)$ corresponds to the Ibrahim-projected point, $$(X, Y, Z) = \left(\frac{X}{V}, \frac{Y}{V}, \frac{Z}{V}\right).$$

Using homogenous projective coordinates, equation 3.3 may be expressed as:

$$\left(\frac{X_3}{V_3}, \frac{Y_3}{V_3}, \frac{Z_3}{V_3}\right) = \left(\frac{X_1}{V_1}, \frac{Y_1}{V_1}, \frac{Z_1}{V_1}\right) + \left(\frac{X_2}{V_2}, \frac{Y_2}{V_2}, \frac{Z_2}{V_2}\right) \quad\quad 4.3$$

The following description shows how the homogenous projective coordinates can be used to remove the need for modular inversion or division from the equations in section 3. This is carried out for each of the above mentioned cases A, B, and C.

Case A:

Substituting for X, Y, and Z in terms of the projective coordinates in equations 4.1.a-c, in equation 3.12, and noting that $c = 1 + am_z^2 + bm_z^3$, one obtains:

$$\frac{X_3'}{V_3} = \frac{(\lambda_{yv}^2 \lambda_{xv} - 2a\lambda_{zv}\lambda_{xv}^2 Z_1 + 2a\lambda_{zv}^2 \lambda_{xv} X_1 - 3b\lambda_{zv}^2 \lambda_{xv} Z_1 + 3b\lambda_{zv}^3 X_1)}{\lambda_{xzv}} - \frac{X_1'}{V_1} - \frac{X_2'}{V_2} \quad\quad 4.4$$

where $$\lambda_{xv} = (X_2 V_1 - X_1 V_2) \quad\quad 4.5$$

$$\lambda_{yv} = (Y_2 V_1 - Y_1 V_2) \quad\quad 4.6$$

$$\lambda_{zv} = (Z_2 V_1 - Z_1 V_2) \quad\quad 4.7$$

$$\lambda_{xzv} = (\lambda_{xv}^3 + a\lambda_{xv}\lambda_{zv}^2 + b\lambda_{zv}^3) \quad\quad 4.8$$

Let $V_3 = V_1 V_2 \lambda_{xv} \lambda_{xzv}$ \quad\quad 4.9

Substituting equation 4.9 for $V_3$ in equation 4.4, the following expression is obtained:

$$X'_3 = \lambda_{xv} A_{x3} \quad\quad 4.10$$

where $$A_{x3} = \{\lambda_{yv}^2 \lambda_{xv} V_2 - \lambda_{zv}(2a\lambda_{xv} + 3b\lambda_{zv})(\lambda_{xv} Z_1 V_2 - \lambda_{zv} X_1 V_2) - \lambda_{xzv}(V_2 X_1 + V_1 X_2)\} \quad\quad 4.11$$

Substituting for X and Y in terms of the projective coordinates in equations 4.1.a & b, in equation 3.5, and after some simplification, the following expression is obtained:

$$\frac{Y_3'}{V_3} = \frac{Y_1}{V_1} + \frac{(Y_2V_1 - Y_1V_2)}{(X_2V_1 - X_1V_2)V_3}\left(X_3' - \frac{X_1V_3}{V_1}\right) \qquad 4.12$$

Substituting equations 4.9 and 4.10 for $V_3$ and $X'_3$ in equation 4.12 results in:

$$Y'_3 = V_2\lambda_{xv}\lambda_{xzv}Y_1 + \lambda_{yv}(A_{x3} - V_2\lambda_{xzv}X_1) \qquad 4.13$$

Substituting for X and Z in terms of the projective coordinates in equations 4.1.a & c, in equation 3.6, and after some simplification, the following equation is obtained:

$$\frac{Z_3'}{V_3} = \frac{Z_1}{V_1} + \frac{(Z_2V_1 - Z_1V_2)}{(X_2V_1 - X_1V_2)V_3}\left(X_3' - \frac{X_1V_3}{V_1}\right) \qquad 4.14$$

Substituting equations 4.9 and 4.10 for $V_3$ and $X'_3$ in equation 4.14, the following is obtained:

$$Z'_3 = V_2\lambda_{xv}\lambda_{xzv}Z_1 + \lambda_{zv}(A_{x3} - V_2\lambda_{xzv}X_1) \qquad 4.15$$

The number of field operations needed in equations 4.10, 4.13 & 4.15 is twenty four multiplications, three squarings, and ten additions. When using mixed coordinates, the number of multiplications may be reduced to twenty multiplications.

Case B:

Substituting for X, Y, and Z in terms of the homogeneous projective coordinate, that is equations 4.1a-c, in equation 3.20, and noting $X_3 = X_1 = X_2 = X_o$, one obtains, $$\frac{Z_3'}{V_3} = \frac{1}{b}\frac{(Y_2V_1 - Y_1V_2)^2}{V_1V_2(Z_2V_1 - Z_1V_2)^2} - \frac{a}{b}\frac{X_1}{V_1} - \frac{Z_1}{V_1} - \frac{Z_2}{V_2} \qquad 4.16$$

Let $V_3 = V_1^2V_2^2(Z_2V_1 - Z_1V_2)^3$ \qquad 4.17

Substituting equation 4.17 for $V_3$ in equation 4.16, one obtains, $$Z_3' = \frac{1}{b}V_1V_2(Z_2V_1 - Z_1V_2)A_{3x} \qquad 4.18$$

where $$A_{3x} = \left\{\begin{array}{c}(Y_2V_1 - Y_1V_2)^2 - \\ (Z_2V_1^2 - Z_1V_2^2)^2\left(\frac{a}{b}X_1V_2 + Z_1V_2 + Z_2V_1\right)\end{array}\right\} \qquad 4.19$$

Substituting for Y and Z in terms of the projective coordinates in equations 4.1.b and c, in equation 3.16, one obtains:

$$\frac{Y_3'}{V_3} = \qquad 4.20$$
$$\frac{Y_1}{V_1} + \frac{(Y_2V_1 - Y_1V_2)}{V_3}\left(\frac{Z_3'}{V_1V_2(Z_2V_1 - Z_1V_2)} - \frac{Z_1V_3}{V_1V_2(Z_2V_1 - Z_1V_2)V_1}\right)$$

Substituting equations 4.17 and 4.18 for $V_3$ and $Z'_3$ in equation 4.20, one obtains:

$$Y_3' = V_1V_2^2(Z_2V_1 - Z_1V_2)^3Y_1 + \qquad 4.21$$

$$(Y_2V_1 - Y_1V_2)\left(\frac{1}{b}A_{3x} - Z_1V_2(Z_2V_1 - Z_1V_2)^2\right)$$

The number of field operations needed in equations 4.18 & 4.21 are sixteen multiplications, two squarings, and seven additions.

Case C:

Case C.1:

Substituting for X, Y, and Z in terms of the projective coordinate in equations 4.1.a-c, in equation 3.22, the following equation is obtained:

$$\frac{X_3'}{V_3} = \frac{(3X_o^2 + aZ_o^2)^2}{4V_o^2Y_o^2} - 2\frac{X_o}{V_o} \qquad 4.22$$

Let $V_3 = 8V_o^3Y_o^3$ \qquad 4.23

Substituting equation 4.23 for $V_3$ in equation 4.22, the following equation is obtained:

$$X'_3 = 2V_oY_oD_{3x} \qquad 4.24$$

where $$D_{3x} = \{(3X_o^2 + aZ_o^2)^2 - 8V_oY_o^2X_o\} \qquad 4.25$$

Substituting for X, Y, and Z in terms of the projective coordinate in equations in equations 4.1a-c, in equation 3.5 and using the gradient in equation 3.21, the following equation is obtained:

$$\frac{Y_3'}{V_3} = \frac{Y_o}{V_o} + \frac{3X_o^2 + aZ_o^2}{V_3}\left(\frac{2V_oY_oD_{3x}}{2V_oY_o} - \frac{X_oV_3}{2V_oY_oV_o}\right) \qquad 4.26$$

Substituting equation 4.23, 4.24 and 4.25 for $V_3$, $X'_3$ and $D_{3x}$ in equation 4.26, the following equation is obtained:

$$Y'_3 = 8V_o^2Y_o^4 + 3X_o^2 + aZ_o^2((3X_o^2 + aZ_o^2)^2 - 12V_oY_o^2X_o) \qquad 4.27$$

The number of field operations needed in equations 4.24 & 4.27 are six multiplications, four squarings, and five additions.

Case C.2:

Substituting for X, Y, and Z in terms of the projective coordinate in equations 4.1a-c, in equation 3.24, the following equation is obtained:

$$\frac{Z_3'}{V_3} = \frac{1}{b}\frac{(2aX_oZ_o + 3bZ_o^2)^2}{4Y_o^2V_o^2} - \frac{a}{b}\frac{X_o}{V_o} - 2\frac{Z_o}{V_o} \qquad 4.28$$

Let $V_3 = 8V_o^3Y_o^3$ \qquad 4.29

Substituting equation 4.29 for $V_3$ in equation 4.28, the following equation is obtained:

$$Z'_3 = 2V_oY_oD_{3z} \qquad 4.30$$

where $$D_{3z} = \left\{\frac{1}{b}(2aX_oZ_o + 3bZ_o^2)^2 - 4\frac{a}{b}V_oY_o^2X_o - 16V_oY_o^2Z_o\right\} \qquad 4.31$$

Substituting for X, Y, and Z in terms of the projective coordinate in equations 4.1a-c, in equation 3.16 and using the gradient in equation 3.23, the following equation is obtained:

$$\frac{Y'_3}{V_3} = \frac{Y_0}{V_o} + \frac{2aX_oZ_o + 3bZ_o^2}{2V_oY_0}\left(\frac{Z'_3}{V_3} - \frac{Z_o}{V_o}\right) \quad 4.32$$

Substituting equations 4.29 and 4.30 for $V_3$ and $Z'_3$ in equation 4.32, the following equation is obtained:

$$Y'_3 = 8V_o^2Y_o^3Y_o + (2aX_oZ_o + 3bZ_o^2)(D_{3x} - 4V_oY_o^2Z_o) \quad 4.33$$

The number of field operations needed in equations 4.30 and 4.33 are ten multiplications, three squarings, and five additions.

EC³ Elliptic Curve Cryptography Based Password Protocols: Deterministic and Non-Iterative Embedding Method In co-pending U.S. patent application Ser. No. 12/044,606 titled "XZ-Elliptic Curve Cryptography with Secret Key Embedding" filed on Mar.7,2008, and incorporated herein by reference in its entirety, an embedding method is described embeds a bit string into an appropriate elliptic curve point in projective coordinates in a deterministic and non-iterative manner. This method circumvents the need for an iterative algorithm that involves a conventional search for a quadratic residue value of the y-coordinate (typically requiring several iterations). The embedding method is described again herein as it relates to password protocols based on XZ-Elliptic Curve Cryptography.

To describe the method of embedding, the twist of an elliptic polynomial equation is defined. A particular elliptic curve equation in projective coordinates is defined over a finite filed F(p), viz.

$$Y^2 = X^3 + aXZ^2 + bZ^3 \quad 5.1$$

Given certain values for the X-coordinate and Z-coordinate, $X_o$ and $Z_o$, respectively, that are elements of the finite field, F(p), by substituting these values in the elliptic curve equation in projective coordinates, the quadratic equation in Y may be expressed as:

$$Y^2 = X_o^3 + aX_oZ_o^2 + bZ_o^3 = T \quad 5.2$$

If the solutions of the above quadratic equation, i.e., $Y^2=T$, are elements of the finite filed F(p), the point $(X_o, Y, Z_o)$ is said to satisfy the given elliptic curve equation. If solutions of the above quadratic equation are not elements of the finite filed F, the point $(X_o, Y, Z_o)$ is said to satisfy the twist of the given elliptic curve equation.

The following process is based on an isomorphic relationship between a curve and its twist. An elliptic curve equation in projective coordinates is isomorphic to its twist if:

1. there are mathematical mappings that can be defined on the values of X & Z, i.e., $\phi_X(X)$, $\phi_Y(Y)$ and $\phi_Z(Z)$, such that any point (X, Y, Z) that satisfies one of these elliptic curve equations in projective coordinates can be mapped into another point $(\phi_X(X), \phi_Y(Y), \phi_Z(Z))$ that satisfies the twist of the same elliptic curve equation in projective coordinate, i.e., the mappings is onto,
2. the mapping between the points (X, Y, Z) and $(\phi_X(X), \phi_Y(Y), \phi_Z(Z))$ is unique, i.e., one-to-one.

This can be shown as follows. Let the right hand side of equation 5.1 be denoted as T, resulting in:

$$T = X^3 + aXZ^2 + bZ^3 \quad 5.3$$

where X, Z, T, a & b∈F(p). Any value of X and Z will result in a value of T∈F(p). T can be either quadratic residue or non-quadratic residue. If T is quadratic residue, equation 5.3 is written as follows:

$$T_q = X_q^3 + aX_qZ_q^2 + bZ_q^3 \quad 5.4$$

where $X_q$ & $Z_q$∈F(p) denote the values of X and Z that result in a quadratic residue value of T, which is denoted as $T_q$. If T is non-quadratic residue, equation 5.3 is written as follows:

$$T_{\bar{q}} = X_{\bar{q}}^3 + aX_{\bar{q}}Z_{\bar{q}}^2 + bZ_{\bar{q}}^3 \quad 5.5$$

where $X_{\bar{q}}$ & $Z_{\bar{q}}$∈F(p) denote the values of X and Z that result in a non-quadratic residue value of T, which is denoted as $T_{\bar{q}}$. Let g be any non-quadratic number in F(p), i.e., g∈F(p) & $\sqrt{g}$∉F(p). Multiplying equation 5.4 with $g^3$ results in the following equation $g^3T_q = g^3X_q^3 + ag^3X_qZ_q^2 + bg^3Z_q^3$ which can be re-written as:

$$g^3T_q = (gX_q)^3 + a(gX_q)(gZ_q)^2 + b(gZ_q)^3 \quad 5.6$$

Note that if g is non quadratic residue, $g^3$ is also non-quadratic residue. Also, it is well known that the result of multiplying a quadratic residue number by a non-quadratic residue number is non-quadratic residue number. Hence, $g^3T_q$ is non quadratic residue. By comparing the terms of equations 5.5 and 5.6, one can obtain the following mappings, $$X_{\bar{q}} = gX_q \quad 5.7$$

$$Z_{\bar{q}} = gZ_q; \text{ and} \quad 5.8$$

$$T_{\bar{q}} = g^3T_q \quad 5.9$$

The mappings between the variables:
(i) $X_q$ and $X_{\bar{q}}$ in equation 5.7;
(ii) $Z_q$ and $Z_{\bar{q}}$ in equation 5.8; and
(iii) $T_q$ and $T_{\bar{q}}$ in equation 5.9, are all bijective, i.e., onto and one-to-one. As a consequence, the mappings between the three tuple $(X_q, T_q, Z_q)$ and the three tuple $(X_{\bar{q}}, T_{\bar{q}}, Z_{\bar{q}})$ are also bijective. Therefore, for every solution of equation 5.4, there is an isomorphic solution which satisfies equation 5.5, where the mappings of the coordinates of one to the other are given in equations 5.7 to 5.9, and hence these two solutions are isomorphic to each other.

Since $T_q$ is quadratic residue, it may be expressed as:

$$T_q = Y^2 \quad 5.10$$

Therefore, from equation 5.9, $T_{\bar{q}}$ may be expressed as:

$$T_{\bar{q}} = g^3Y^2 \quad 5.11$$

Using equations 5.10 and 5.11, equations 5.4 and 5.5 may be expressed as:

$$Y^2 = X_q^3 + aX_qZ_q^2 + bZ_q^3 \text{ and} \quad 5.12$$

$$g^3Y^2 = X_{\bar{q}}^3 + aX_{\bar{q}}Z_{\bar{q}}^2 + bZ_{\bar{q}}^3 \quad 5.13$$

Since any solution of equation 5.4 has an isomorphic solution that satisfies equation 5.5, it follows that the any solution of equation 5.12, denoted as $(X_q, Y, Z_q)$, has an isomorphic solution that satisfies equation 5.13, denoted as $$\left(gX_q, g^{\frac{3}{2}}Y, gZ_q\right).$$

The solutions of equation 5.12, $(X_q, Y, Z_q)$, lead to the elliptic curve in projective coordinates. While, the solutions of equation 5.13, $$\left(gX_q, g^{\frac{3}{2}}Y, gZ_q\right),$$

lead to its twist in projective coordinates.

An example of a mapping of the solutions of $Y^2=X^3+aXZ^2+bZ^3$ defined over $F(p)$ where $p\equiv 3 \bmod 4$ to the solutions of its twist is simply to use $-X$ for the X-coordinate, $-Z$ for the Z-coordinate, and hence $-Y^2$ for the Y-coordinate.

The isomorphism between a curve and its twist discussed above may be exploited to embed the bit sting of a shared secret key into the X and Z coordinate of an elliptic curve point without the need for an iterative search for a quadratic residue value of the corresponding Y-coordinate that usually requires several iterations.

Assume that the bit string to be embedded is M-bits in length and such that the equivalent value of the string M is $2(p-1)>2^M>(p-1)$. The message string is divided into two strings $m_x$ and $m_z$. The value of strings $m_x$ and $m_z$ must be less than p. One implementation to embed the two strings may be carried out as follows:

a) assign the value of the bit string of $m_z$ to $Z_m$;
b) assign the value of the bit string of $m_x$ to $X_m$;
c) compute $T=X_m^3+aX_mZ_m^2+bZ_m^3$; and
d) use Legendre test to see if T has a square root, and if T has a square root, assign one of the roots to $Y_m$, else assign one of the roots of $|g^3T|Y_m$, and the X-coordinate, and the Z-coordinate of the elliptic curve point with embedded secret key bit strings are given by $gX_m$, and $gZ_m$, respectively.

When using this process p is usually predetermined prior to encryption, and so the value of g can be predetermined. In addition, the strings $m_x$ and $m_z$ may be recovered directly from $X_m$ and $Z_m$, respectively, and an extra bit is needed to identify whether $(X_m, Y_m, Z_m)$ or $(gX_m, Y_m, gZ_m)$ is used at the sending correspondent. Any non-quadratic value in $F(p)$ can be used for g. For efficiency, g is chosen to be $(-1)$ for $p\equiv 3 \bmod 4$ and (2) for $p\equiv 1 \bmod 4$. At the receiver, the process is reversed. In the case of $g=2$, a division by 2 is carried out. It should be noted that dividing $X_m$ by two is computed using one modulo addition, because:

(i) $X_m/2=((X_m-(X_m)\bmod 2)/2)+(X_m)\bmod 2*(1/2)\bmod p$;
(ii) $(X_m) \bmod 2$ is the least significant bit of $X_m$; and
(iii) $(1/2)\bmod p\ (p+1)/2$.

Figure 2:
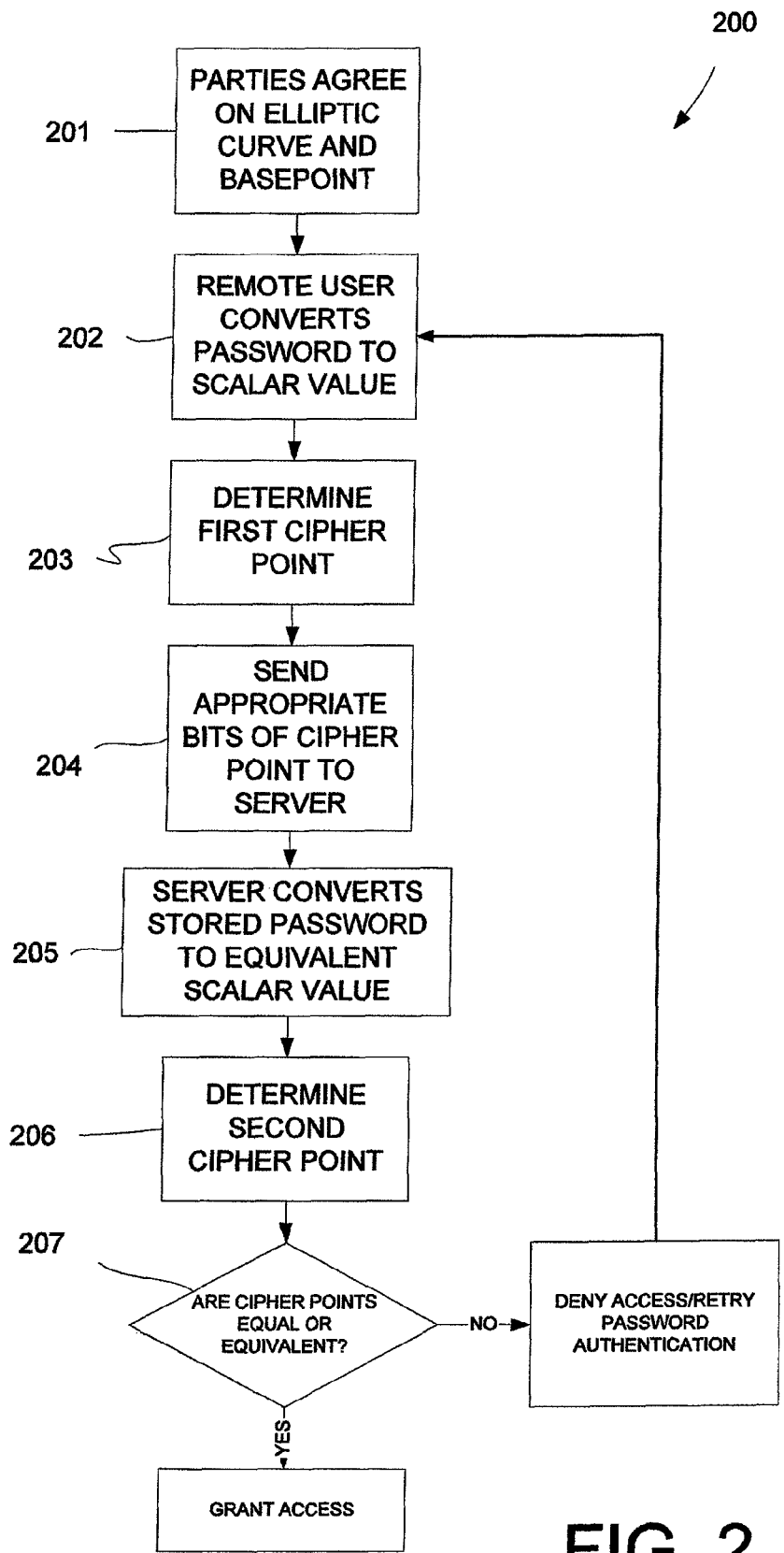
FIG. 2 shows a password protocol for use in the system of FIG. 1.

Symmetric $EC^3$ Cryptography-Based Password Protocol I:

A remote user of a client device may be authenticated using a human recognizable password. A server, for example, may store a file containing the plain passwords of users or images of the passwords under a one-way function. One exemplary implementation of a password protocol 200 for use in such a communications system 100 based on shared key $EC^3$ cryptography is shown in FIG. 2 and is described below.

201) Both the sending and receiving devices (e.g., a client device 110 and a host device 101 (or another client device 110) agree on a set $EC^3$ by selecting an elliptic curve and a base point, $(X_B, Y_B, Z_B)$.

The client device of the remote user performs the following steps:

202) convert the password or its image under a one-way function into an equivalent scalar value, $k_U$;
203) compute the scalar multiplication of the scalar value, $k_U$, with the base point, $(X_B, Y_B, Z_B)$, $(X_C, Y_C, Z_C)=k_U(X_B, Y_B, Z_B)$; and
204) send the appropriate bits of the X-coordinate, $X_C$, and the Z-coordinate, $Z_C$, of the cipher point $(X_C, Y_C, Z_C)$ to the server together with any other information needed to recover the cipher point without sacrificing security.

The server or receiving device performs the following steps:
205) convert the password or its image under a one-way function (e.g., stored in by the server) into an equivalent scalar value, $k_{US}$;

206) compute the scalar multiplication of the scalar value $k_{US}$, with the base point, $(X_B, Y_B, Z_B)$, $(X_{SC}, Y_{SC}, Z_{SC})=k_{US}(X_B, Y_B, Z_{Bs})$; and
207) if $(X_{SC}, Y_{SC}, Z_{SC})$ is equal to $(X_C, Y_C, Z_C)$ or one of its equivalent points, the user is authenticated, otherwise access is denied.

Figure 3:
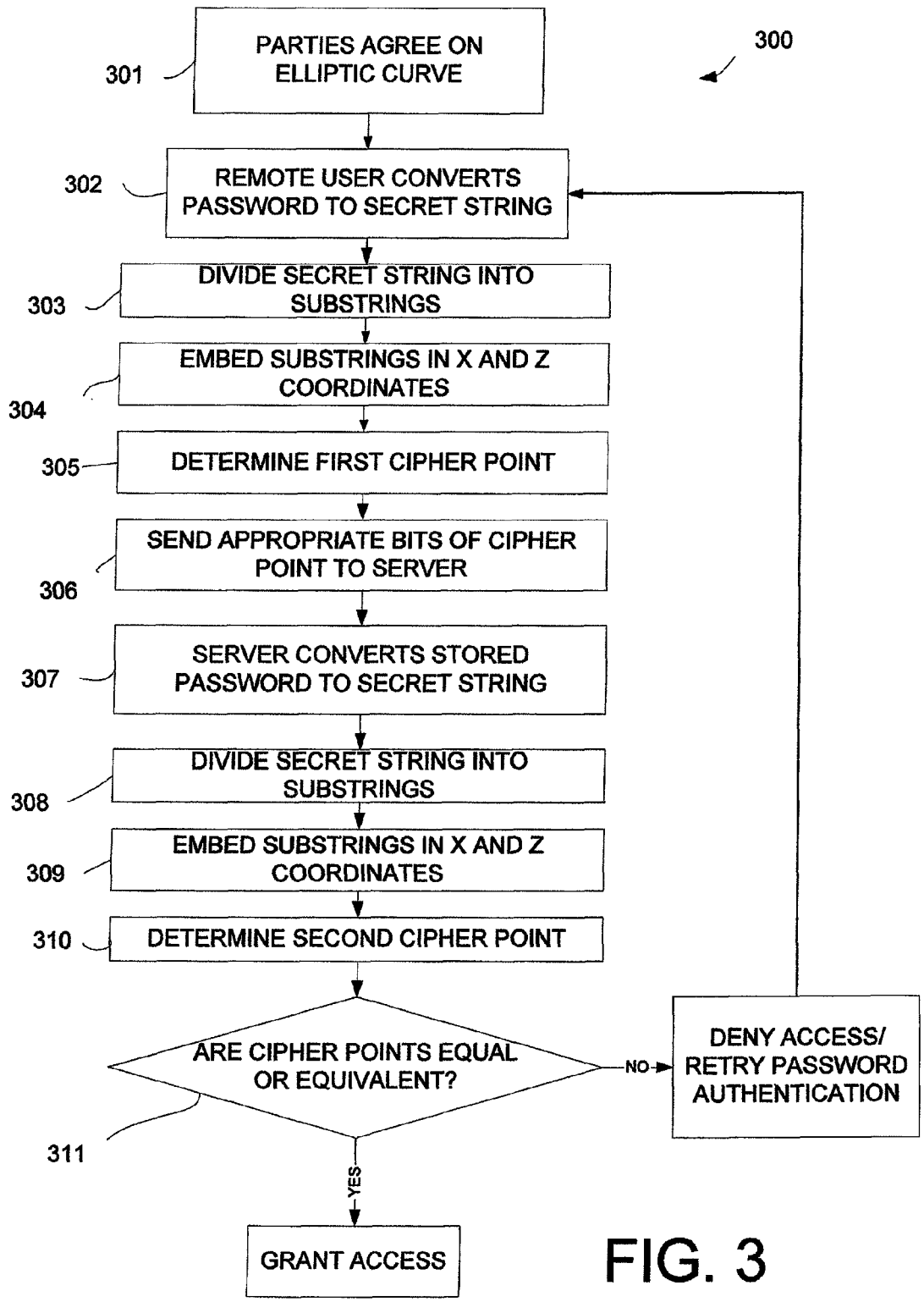
FIG. 3 shows a password protocol for use in the system of FIG. 1.

Symmetric EC Cryptography-based Password Protocol II:

The remote user may be authenticated using a human-recognizable password. The server may store the plain passwords of users or images of the passwords under a one-way function. Another implementation of a password protocol 300 based on $EC^3$ cryptography using password embedding is shown in FIG. 3 and is described below as follows.

301) Both the sending and receiving devices (e.g., a client device 110 and a host device 101 (or another client device 110) agree on a set $EC^3$ by selecting an elliptic curve.

The client device of the remote user performs the following steps:

302) convert the plain password or its image under a one-way function into a secret bit string, $k_p$;
303) divide the secret key string $k_p$ into three binary sub-strings, $k_{p1}$, $k_{p2}$ and $k_{p3}$;
304) embed the secret sub-string $k_{p1}$ and $k_{p2}$ into the X-coordinate and Z-coordinate, and if need be use mathematical mappings between the selected elliptic curve equation and its twist to ensure that the resulting point satisfies a selected elliptic curve to obtain an elliptic point which is designated as the password embedded point, $(X_P, Y_P, Z_P)$; and
305) compute the scalar multiplication of the scalar value, $k_{p3}$, with the password embedded point, $(X_P, Y_P, Z_P)$, $(X_C, Y_C, Z_C)=k_{p3}(X_P, Y_P, Z_P)$; and
306) send the appropriate bits of the X-coordinate, $X_C$, and the Z-coordinate, $Z_C$, of the cipher point $(X_C, Y_C, Z_C)$ to the server together with any other information needed to recover the cipher point without sacrificing security;

The server or receiving device performs the following steps:
307) convert the plain password or its image under a one-way function into a secret bit string, $k_{Sp}$;
308) divide the secret key string $k_{Sp}$ into three binary sub-strings, $k_{Sp1}$, $k_{Sp2}$ and $k_{Sp3}$;
309) embed the secret sub-string $k_{Sp1}$ and $k_{Sp2}$ into the X-coordinate and Z-coordinate, and if need be use mathematical mappings between the selected elliptic curve equation and its twist to ensure that the resulting point satisfies a selected elliptic curve to obtain an elliptic point which is designated as the password embedded point, $(X_{SP}, Y_{SP}, Z_{SP})$;
310) compute the scalar multiplication of the scalar value, $k_{Sp3}$, with the password embedded point, $(X_P, Y_P, Z_P)$, $(X_{SC}, Y_{SC}, Z_{SC})=k_{Sp3}(X_{SP}, Y_{SP}, Z_{SP})$; and
311) if $(X_{SC}, Y_{SC}, Z_{SC})$ is equal to $(X_C, Y_C, Z_C)$ or one of its equivalent points, the user is authenticated, otherwise access is denied.

Figure 4:
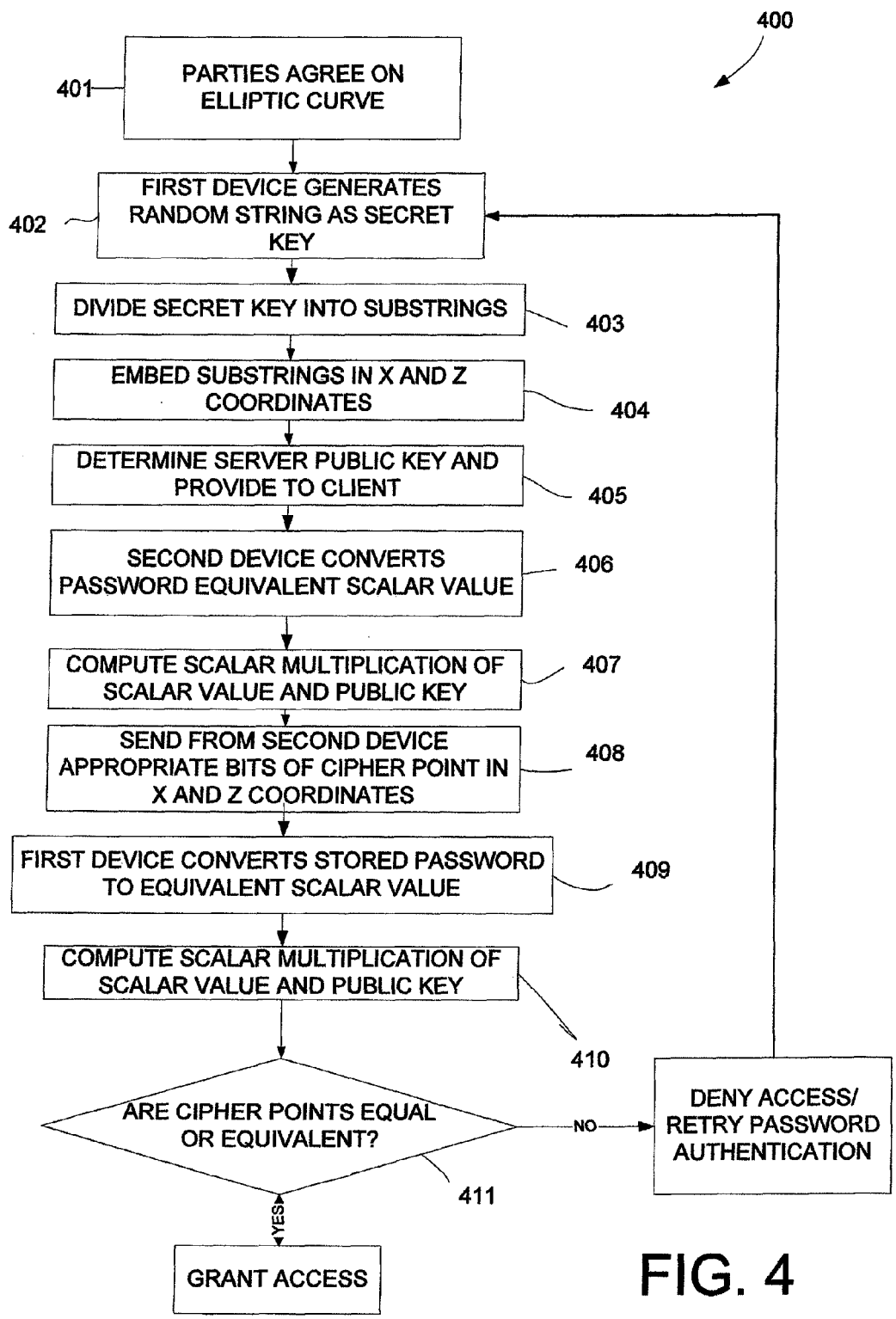
FIG. 4 shows a password protocol for use in the system of FIG. 1.

Public Key $EC^3$ Cryptography Based Password Protocol I:

Password-based public key protocols may be used, for example, in applications where there is a need for a server to authenticate a remote user. Such protocols have been proposed by "S. Halevi and H. Krawczyk, Public key cryptography and password protocols, ACM Transactions on Information and System Security, Vol. 2, No. 3, August 1999". The remote user may be authenticated by a human-recognizable password. The server stores the plain passwords of users or images of the passwords under a one-way function. One example of a Public-key $EC^3$ cryptography based password protocol 400 is shown in FIG. 4 and is described below.

401) Both the sending and receiving devices (e.g., a client device 110 and a host device 101 (or another client device 110) agree on a set $EC^3$ by selecting an elliptic curve.

The server or sending device generates its public key using the following steps:

402) generate a random bit sting that is termed the secret key, $k_s$, of the server;

403) divide the secret key $k_s$ into three binary sub-strings, $k_{S1}$, $k_{S2}$ and $k_{S3}$;

404) embed the secret sub-string $k_{S1}$ and $k_{S2}$ into the X-coordinate and Z-coordinate, and if need be use mathematical mappings between the selected elliptic curve equation and its twist to ensure that the resulting point satisfies a selected elliptic curve to obtain an elliptic point which is designated as the secret-key embedded point of the server, $(X_S, Y_S, Z_S)$; and 405) compute the scalar multiplication of the scalar value of the third secret sub-string $k_{S3}$ with the secret-key embedded point of the server, $(X_S, Y_S, Z_S)$ to obtain the server public key,
$(X_{SPu}, Y_{SPu}, Z_{SPu}) = k_{S3}(X_S, Y_S, Z_S)$.

The client device of the remote user performs the following steps:

406) convert the plain password or its image under a one-way function into an equivalent scalar value, $k_U$;

407) compute the scalar multiplication of the scalar value, $k_U$, with the server pubic key, $(X_{SPu}, Y_{SPu}, Z_{SPu})$,
$(X_C, Y_C, Z_C) = k_U(X_{SPu}, Y_{SPu}, Z_{SPu})$; and 408) the appropriate bits of the X-coordinate, $X_C$, and the Z-coordinate, $Z_C$, of the cipher point $(X_C, Y_C, Z_C)$ are sent to the server together with any other information needed to recover the cipher point without sacrificing security.

The server performs the following steps:

409) convert the plain password or its image under a one-way function stored in its files into an equivalent scalar value, $k_{US}$;

410) compute the scalar multiplication of the scalar value, $k_{US}$, with the server pubic key, $(X_{SPu}, Y_{SPu}, Z_{SPu})$,
$(X_{SC}, Y_{SC}, Z_{SC}) = k_{US}(X_{SPu}, Y_{SPu}, Z_{SPu})$; and 411) if $(X_{SC}, Y_{SC}, Z_{SC})$ is equal to $(X_C, Y_C, Z_C)$ or one of its equivalent points, the user is authenticated, otherwise access is denied.

Figure 5:
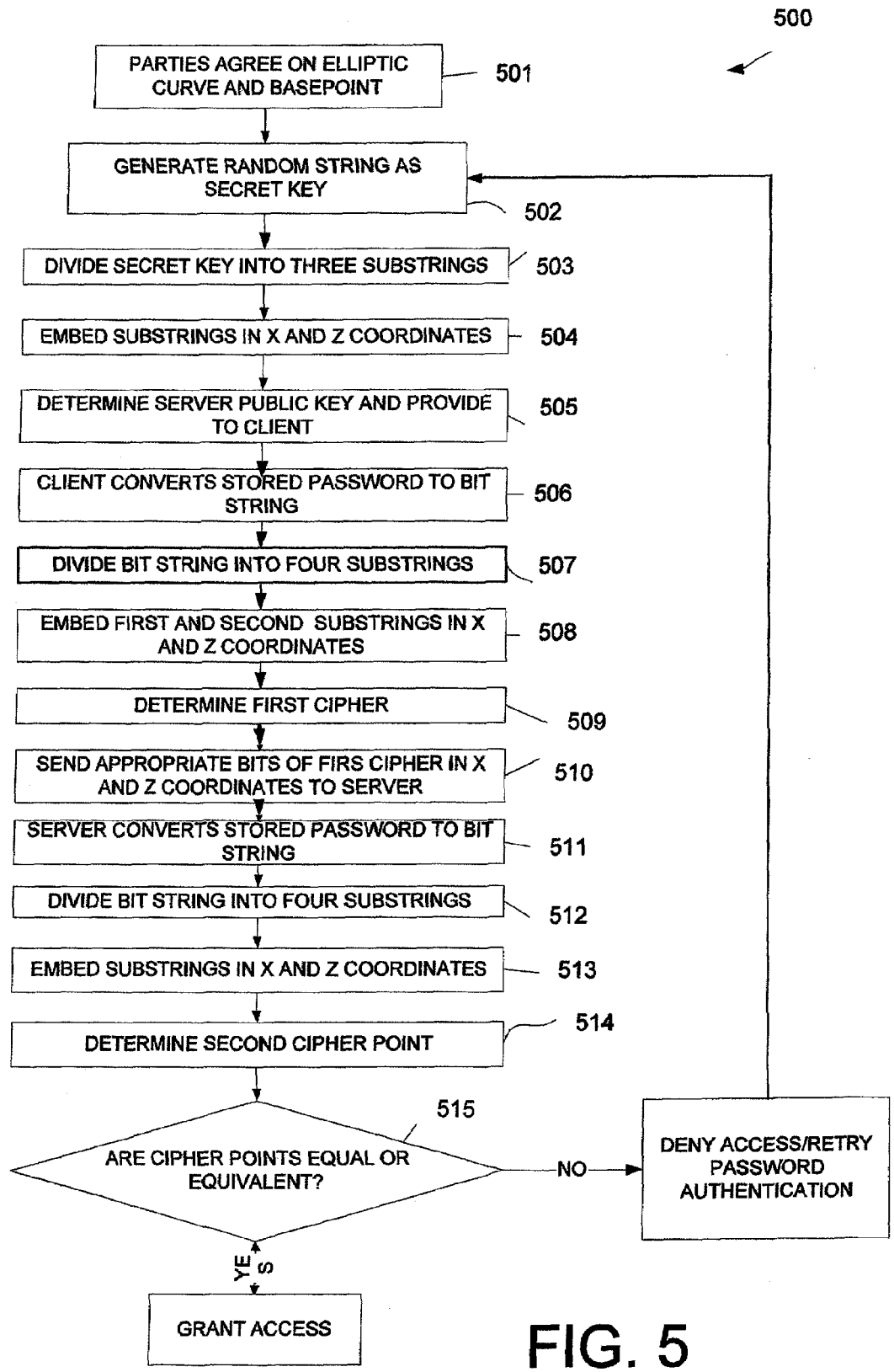
FIG. 5 shows a password protocol for use in the system of FIG. 1.

Public Key $EC^3$ Cryptography Based Password Protocol II:

Another password protocol 500 based on public key $EC^3$ cryptography is shown in FIG. 5 and is described below.

501) Both the sending and receiving devices (e.g., a client device 110 and a host device 101 (or another client device 110) agree on a set $EC^3$ by selecting an elliptic curve.

The server or sending device generates its public key using the following steps:

502) generate a random bit string that is the secret key, $k_s$, of the server;

503) divide the secret key $k_s$ into three binary sub-strings, $k_{S1}$, $k_{S2}$ and $k_{S3}$;

504) embed the secret sub-string $k_{S1}$ and $k_{S2}$ into the X-coordinate and Z-coordinate, and if need be use mathematical mappings between the selected elliptic curve equation and its twist to ensure that the resulting point satisfies a selected elliptic curve to obtain an elliptic point which is designated as the secret-key embedded point of the server, $(X_S, Y_S, Z_S)$; and 505) compute the scalar multiplication of the scalar value of the third secret sub-string $k_{S3}$ with the secret-key embedded point of the server, $(X_S, Y_S, Z_S)$ to obtain the server public key,
$(X_{SPu}, Y_{SPu}, Z_{SPu}) = k_{S3}(X_S, Y_S, Z_S)$.

The client device of the remote user performs the following steps:

506) convert the plain password or its image under a one-way function into a bit string;

507) divide the user bit string into four strings, $k_{U1}$, $k_{U3}$, $k_{U3}$, $k_{U4}$;

508) embed the secret sub-string $k_{U1}$ and $k_{U2}$ into the X-coordinate and Z-coordinate, and if need be use mathematical mappings between the selected elliptic curve equation and its twist to ensure that the resulting point satisfies a selected elliptic curve to obtain an elliptic point which is designated as the secret-key embedded point of the user, $(X_U, Y_U, Z_U)$; and 509) compute the scalar multiplication of the scalar value, $k_{U3}$, with the server pubic key, $(X_{SPu}, Y_{SPu}, Z_{SPu})$, and the scalar value, $k_{U4}$, with the user point, $(X_U, Y_U, Z_U)$, and compute the point $(X_C, Y_C, Z_C)$,
$(X_C, Y_C, Z_C) = k_{U3}(X_{SPu}, Y_{SPu}, Z_{SPu}) + k_{U4}(X_U, Y_U, Z_U)$; and 510) the appropriate bits of the X-coordinate, $X_C$, and Z-coordinate, $Z_C$, of the cipher point $(X_C, Y_C, Z_C)$ are sent to the server together with any other information needed to recover the cipher point without sacrificing security The server performs the following steps:

511) convert the plain password or its image under a one-way function into a bit string;

512) divide the user bit string into four strings, $k_{US1}$, $k_{US3}$, $k_{US3}$, $k_{US4}$;

513) embed the secret sub-string $k_{US1}$ and $k_{US2}$ into the X-coordinate and Z-coordinate, and if need be use mathematical mappings between the selected elliptic curve equation and its twist to ensure that the resulting point satisfies a selected elliptic curve to obtain an elliptic point which is designated as the secret-key embedded point of the user, $(X_{US}, Y_{US}, Z_{US})$;

514) compute the scalar multiplication of the scalar value, $k_{US3}$, with the server pubic key, $(X_{SPu}, Y_{SPu}, Z_{SPu})$, and the scalar value, $k_{US4}$, with the user point, $(X_{US}, Y_{US}, Z_{US})$, and compute the point $(X_{SC}, Y_{SC}, Z_{SC})$ where,
$(X_{SC}, Y_{SC}, Z_{SC}) = k_{US3}(X_{SPu}, Y_{SPu}, Z_{SPu}) + k_{US4}(X_{US}, Y_{US}, Z_{US})$; and 515) if $(X_{SC}, Y_{SC}, Z_{SC})$ is equal to $(X_C, Y_C, Z_C)$ or one of its equivalent points, the user is authenticated, otherwise access is denied.

Public Key $EC^3$ Cryptography Based Password Protocol III:

The Secure Remote Password (SRP) Protocol is being considered by the IEEE P1363 working group (http://grouper.ieee.org/groups/1363/) as a possible standard for remote user access based on password protocol. This password protocol also results in a shared secret key. The SRP which was developed originally for the discrete logarithm problem over finite field has been adapted as described herein for the discrete logarithm problem defined over an elliptic curve in projective coordinates, i.e., using $EC^3$ Cryptography.

A complete description of the $EC^3$-SRP is given below. Definitions of the variables used are given in Table 5.1. Both parties agree on an elliptic curve defined over a finite filed F(p).

TABLE 5.1

Definition of variables used in SRP Protocol

| | |
|---|---|
| p | A large prime number. |
| $(X_B, Y_B, Z_B)$ | An elliptic curve point defined over a selected elliptic curve in projective coordinate defined over a large prime number p. |
| a | A random string used as the user's salt |
| pw | The user's password |
| x | A private key derived from the password and salt |
| $(X_v, Y_v, Z_v)$ | The host's password verifier |
| t | Random scrambling parameter, publicly revealed |
| u, s | Ephemeral private keys, generated randomly and not publicly revealed |
| $(X_U, Y_U, Z_U)$ $(X_S, Y_S, Z_S)$ | User's public key and server's public key |
| H( ) | One-way hash function |
| m, n | The two quantities (strings) m and n concatenated |
| K | Session key |

To establish a password pw with a server, the remote user picks a random salt a, and computes:

$$x = H(a, pw)$$

$$(X_v, Y_v, Z_v) = x(X_B, Y_B, Z_B)$$

The remote user stores $(X_v, Y_v, Z_v)$ and a as the users's password verifier and salt. To authenticate the identity of the remote user, the remote user and the server engage in the protocol described in Table 5.2.

TABLE 5.2

The EC³-SRP Protocol

| | Remote User | | Server |
|---|---|---|---|
| 1. | | C --> | (lookup a, $(X_v, Y_v, Z_v)$) |
| 2. | x = H(a, pw) | <-- a | |
| 3. | $(X_U, Y_U, Z_U) = u(X_B, Y_B, Z_B)$ | $X_U, Z_U$ --> | |
| 4. | | <-- $X_S, Z_S$ & t | $(X_S, Y_S, Z_S) = (X_v, Y_v, Z_v) + s(X_B, Y_B, Z_B)$ |
| 5. | $(X_{SU}, Y_{SU}, Z_{SU}) = (u + tx)((X_S, Y_S, Z_S) - x(X_B, Y_B, Z_B))$ | | $(X_{SU}, Y_{SU}, Z_{SU}) = s((X_U, Y_U, Z_U) + t(X_v, Y_v, Z_v))$ |
| 6. | $K = H(X_{SU}, Z_{SU})$ | | $K = H(X_{SU}, Z_{SU})$ |
| 7. | $M[1] = H(X_U, Z_U, X_S, Z_S, K)$ | M[1] --> | (verify M[1]) |
| 8. | (verify M[2]) | <-- M[2] | $M[2] = H(X_U, Z_U, M[1], K)$ |

The following is a description of the process shown in Table 5.2.

1) The remote user sends the server its username, (e.g., C).
2) The server looks up the remote user's password entry and fetches its password verifier $(X_v, Y_v, Z_v)$ and its salt a. The server sends a to the remote user. The remote user computes its long-term private key x using a and their real password pw.
3) The remote user generates a random number u, 1<u<p, computes their ephemeral public key $(X_U, Y_U, Z_U) = u(X_B, Y_B, Z_B)$, and sends the key to the server.
4) The server generates its own random number s, 1<s<p, computes its ephemeral public key $(X_S, Y_S, Z_S) = (X_v, Y_v, Z_v) + s(X_B, Y_B, Z_B)$, and sends the key back to the remote user, along with a randomly generated parameter t.
5) The remote user and the server compute the common exponential value $(X_{SU}, Y_{SU}, Z_{SU}) = (us+stx)(X_B, Y_B, Z_B)$ using the values available to each of them. If the remote user's password pw entered in Step 2 matches the one they originally used to generate $(X_v, Y_v, Z_v)$, then both values of $(X_{SU}, Y_{SU}, Z_{SU})$ will match.
6) Both the remote user and server hash $X_{SU}$ and $Z_{SU}$ into a cryptographically strong session key.
7) The remote user sends the server M[1] as evidence that it has the correct session key. The server computes M[1] itself and verifies that it matches what the remote user sent.
8) The server sends the remote user M[2] as evidence that the server also has the correct session key. The remote user also verifies M[2] itself, accepting only if it matches the server's value.

Both sides agree on the session key $(X_{SU}, Y_{SU}, Z_{SU}) = (us+stx)(X_B, Y_B, Z_B)$ if all steps are executed correctly. EC³-SRP also adds steps 7 and 8 to the process to verify session key agreement using a one-way hash function. Once the protocol run completes successfully, both parties may use K to encrypt subsequent session traffic.

It is worth pointing that the security of the EC³-SRP is the same as the original SRP defined over discrete logarithm over a finite field described above in password protocol and public-key cryptography. One description of the security analysis of the original SRP may be found in the document by Thomas Wu which was submitted to the IEEE P1363 working group. A full copy of the document may be found in the following website (http://grouper.ieee.org/groups/1363/).

Security of EC³:

The effect of using the X-coordinate and the Z-coordinate of an elliptic curve point when represented in projective coordinate in the encrypting of message data bit-strings on the strength of elliptic curve cryptography is assessed for the effect on the solution of ECDLP and power analysis attacks.

ECDLP in EC³:

The apparent intractability of the following elliptic curve discrete logarithm problem (ECDLP) is the basis of the security of elliptic curve cryptosystems. The ECDLP problem can be stated as follows: given an elliptic curve defined over F(p) that need N-bit for the representation of its elements, an elliptic curve point $(x_P, y_P) \in EC^2$ defined in affine coordinates, and a point $(x_Q, y_Q) \in EC^2$ defined in affine coordinates, determine the integer k, $0 \leq k \leq p-1$, such that $(x_Q, Y_Q) = k(x_P, y_P)$ provided that such an integer exist. In what follows, it is assumed that such an integer exists.

The ECDLP in EC³ can be stated as follows: given a point $(X_P, Y_P, Z_P) \in EC^3$ and a point $(X_Q, Y_Q, Z_Q) \in EC^3$ defined in projective coordinates, find k such that $(X_Q, Y_Q, Z_Q) = k(X_P, Y_P, Z_P)$.

The most well known method to solve the ECDLP is that of Pollard ρ-method, (e.g., J. Pollard, Monte Carlo methods for index computation mod p, Mathematic and Computation, Vol. 32 (1978) pp. 918-924) which has a complexity of O($\sqrt{\pi p}/2$), where a step means an elliptic curve point addition (e.g., N. Kobltiz, A. Menezes, S. Vanstone, The state of Elliptic Curve Cryptography, Designs, Codes, and Cryptography, Vol 19, 2000, pp 173-193).

In $EC^3$, where the point $(X_P, Y_P, Z_P)$ is given the modified Pollard ρ-method can be formulated as follows: find two points $(X_i, Y_i, Z_i) = A_i(X_Q, Y_Q, Z_Q) + B_i k(X_P, Y_P, Z_P)$ and $(X_j, Y_j, Z_j) = A_j(X_Q, Y_Q, Z_Q) + B_j k(X_P, Y_P, Z_P)$ such that $(X_i, Y_i, Z_i) = (X_j, Y_j, Z_j)$, and hence $$k = \frac{A_i + A_j}{B_i + B_j},$$

and given that all the points are members of $EC^3$.

It is clear that the complexity of the Pollard ρ-method in $EC^3$, where the point $(X_P, Y_P, Z_P)$ is known is not less than the complexity of the Pollard ρ-method in $EC^2$ for the same group order. Furthermore, the problem is even more difficult with password embedding since the point $(X_P, Y_P, Z_P)$ is not public.

Security Against SPA and DPA:

Simple and differential power analysis can be used to attack $EC^3$ cryptosystems in a similar manner in which they are used to attack $EC^2$ cryptosystems.

The countermeasures that are used against simple and differential power analysis for $EC^2$ cryptosystems are also applicable for $EC^3$. For example, the countermeasures proposed by J-S Coron, in "Resistance Against Differential Power Analysis for Elliptic Curve Cryptosystems, Cryptographic Hardware and Embedded Systems, Vol. 1717, Lecture Notes in Computer Science, pp 292-302, Springer-Verlag, 1999" may be used as countermeasures against power analysis in $EC^3$ cryptosystems. As an example, the randomized projective coordinates method can be applied in $EC^3$ by randomizing the coordinates of the second projection, that is $(X', Y', Z', V) = (X'\lambda, Y'\lambda, Z'\lambda, V\lambda)$, where λ is a random variable.

Furthermore, as discussed above in attacks, one countermeasure against Differential Power Analysis is randomization of the base point. Since, the base point in symmetric $EC^3$ Cryptography with shared secret key embedding is effectively changing at random for every new data block, clearly $EC^3$ Cryptography with shared secret key embedding has an inherent countermeasure against Differential Power Analysis.

As an example, consider the case of $N_P=1$ and $k_{r,j,i}=0$ in symmetric $EC^3$ cryptography discussed above in public key $EC^3$ cryptography based password protocol I. The point $(XR_{x,j,1}, YR_{j,1}, ZR_{z,j,1})$ is computed using, $$(XR_{x,j,1}, YR_{j,1}, ZR_{z,j,1}) = k_{s,j,1}(XK_{x,j,1}, YK_{j,1}, ZK_{z,j,1})$$

and the cipher point is computed using, $$(X_{c,j}, Y_{c,j}, Z_{c,j}) = (X_{m,j}, Y_{m,j}, Z_{m,j}) + (XR_{x,j,1}, YR_{j,1}, ZR_{z,j,1})$$

As discussed above in public key $EC^3$ cryptography based password protocol I, the point $(XK_{x,j,1}, YK_{j,1}, ZK_{z,j,1})$ is generated by embedding a randomly generated key into the X-coordinate and the Z-coordinate.

As a consequence, the randomly generated point $(XK_{x,j,1}, YK_{j,1}, ZK_{z,j,1})$ is equivalent to blinding a base point through randomization. Therefore, the new disclosed symmetric $EC^3$ cryptography with shared secret key embedding inherently provides a countermeasure against differential power analysis.

The Legendre Symbol is used to test whether an element of $F(p)$ has a square root or not, i.e., whether an element is quadratic residue or not. This implies that one does not need to compute the square root to check if an element has a square root or not. The Legendre Symbol and test is described below:

Legendre Symbol

Given an element of a finite field $F(p)$, say d, the Legendre symbol is defined as $$\left(\frac{d}{p}\right).$$

To test whether d is quadratic residue or not, the Legendre symbol, $$\left(\frac{d}{p}\right),$$

is used:

$$\left(\frac{d}{p}\right) = \begin{cases} +1 & \text{if } x \text{ is quadratic residue} \\ 0 & \text{if } x \equiv 0 \mod F(p) \\ -1 & \text{otherwise} \end{cases}$$

A number of exemplary implementations have been described. Nevertheless, it will be understood that various modifications may be made. For example, suitable results may be achieved if the steps of described techniques are performed in a different order and/or if components in a described system, architecture, device, or circuit are combined in a different manner and/or replaced or supplemented by other components. Accordingly, other implementations are within the scope of the following claims.

What is claimed is:

1. A method for authenticating the identity of a device over an unsecured communications channel using a selected elliptic curve and a base point, the method comprising:
   providing a communication system including a client computer device and a host computer device connected to said client computer device using a communication channel to provide network online services, contents and resources to one or more client devices and their users;
   encrypting a password using a deterministic and non-iterative process for embedding bit strings into the X coordinates and Z coordinates of points on a projected elliptic curve defined over a finite field and represented in projective coordinates;
   transmitting the encrypted data from said host computer device over the communication channel to the receiving computer device; and
   authenticating the password, wherein
   the projective coordinates ensure that the projected elliptic curve and its twist are isomorphic to each other.

2. The method of claim 1 wherein the isomorphic relationship between the projected elliptic curve and its twist is obtained as a result of the selected projective coordinates to ensure that any bit string whose equivalent binary value is an element of the underlying finite field has a bijective relationship between the bit string and a point on the projected elliptic curve or its twist.

3. A method for authenticating the identity of a first host computer device by a second client computer device over an unsecured communications channel using a password protocol based on shared key $EC^3$ cryptography, the method comprising:

providing a communication system including a client computer device and a host computer device connected to said client computer device using a communication channel to provide network online services, contents and resources to one or more client devices and their users;

agreeing by the host computer device and client computer device on a set $EC^3$ by selecting an elliptic curve and a base point;

converting a password of the host computer device by the client computer device to a first key;

determining by the first device a cipher point based on the first key; and transmitting bits of the cipher point from the first device over the communications channel using the X-coordinate and the Z-coordinate of a projected elliptic curve when represented in projective coordinates, and wherein the projective coordinates ensure that the elliptic curve and its twist are isomorphic to each other.

4. The method of claim 3 further comprising:

converting by the client computer device a stored password of the host computer device to a second key;

determining by the client computer device a cipher point based on the second key;

receiving at the client computer device the transmitted bits of the cipher point associated with the first key;

determining by the client computer device the cipher point of the second key is equal to the cipher point of the first key or one of its equivalents; and authenticating the password.

5. A method for authenticating the identity of a host computer device having a password by a client computer device over an unsecured communications channel using a password protocol based on shared key $EC^3$ cryptography using a selected elliptic curve and base point $(X_B, Y_B, Z_B)$, the method comprising:

providing a communication system including a client computer devices and a host computer device connected to said client computer device using a communication channel to provide network online services, contents and resources to one or more client devices and their users;

converting by the first host device the password or its image under a one-way function into an equivalent scalar value, $k_U$;

determining by the first host device a first cipher point $(X_C, Y_C, Z_C)$ by scalar multiplication of a scalar value, $k_U$, with the base point, $(X_B, Y_B, Z_B)$; and transmitting from the first host device bits of the X-coordinate, $X_C$, and the Z-coordinate, $Z_C$, of the first cipher point in projective coordinates of a projected elliptic curve to the client computer device for password verification, wherein the projective coordinates ensure that the projected elliptic curve and its twist are isomorphic to each other.

6. The method of claim 5 further comprising:

converting by the client computer device the password or its image stored by the client computer device under a one-way function into an equivalent scalar value, $k_{US}$;

determining by the client computer device a second cipher point $(X_{SC}, Y_{SC}, Z_{SC})$ by scalar multiplication of the scalar value $k_{US}$, with the base point, $(X_B, Y_B, Z_B)$;

recovering by the client computer device the first cipher point from the transmitted bits;

determining by the client computer device if the second cipher point is equal to first cipher point or one of its equivalent points based on the transmitted bits; and authenticating by the client computer device the identity of the host computer device.

7. A method for authenticating the identity of a first host computer device having a password by a second client computer device over an unsecured communications channel using a password protocol based on a set $EC^3$ using a selected elliptic curve, the method comprising:

providing a communication system including a client computer device and a host computer device connected to said client computer device using a communication channel to provide network online services, contents and resources to one or more client devices and their users;

converting by the first host computer device the password or its image under a one-way function into a secret bit string, $k_p$;

dividing by the first host computer device the secret key string $k_p$ into three binary sub-strings, $k_{p1}$, $k_{p2}$ and $k_{p3}$;

embedding by the first host computer device the secret sub-string $k_{p1}$ and $k_{p2}$ into an X-coordinate and Z-coordinate using a deterministic and non-interactive process to obtain the password embedded point, $(X_P, Y_P, Z_P)$;

determining by the first host computer device a first cipher point $(X_C, Y_C, Z_C)$ by scalar multiplication of the scalar value, $k_{p3}$, with the password embedded point, $(X_P, Y_P, Z_P)$; and transmitting by the first host computer device bits of the X-coordinate, $X_C$, and the Z-coordinate, $Z_C$, of the first cipher point $(X_C, Y_C, Z_C)$ to the client computer device.

8. The method of claim 7 further comprising:

converting by the client computer device a stored password of the host computer device or its image under a one-way function into a secret bit string, $k_{Sp}$;

dividing by the client computer device the secret key string $k_{Sp}$ into three binary sub-strings $k_{Sp1}$, $k_{Sp2}$ and $k_{Sp3}$;

embedding by the client computer device the secret sub-string $k_{Sp1}$ and $k_{Sp2}$ into the X-coordinate and Z-coordinate using a deterministic and non-iterative process to obtain the password embedded point, $(X_{SP}, Y_{SP}, Z_{SP})$;

determining by the client computer device a second cipher point $(X_{SC}, Y_{SC}, Z_{SC})$ by scalar multiplication of the scalar value, $k_{Sp3}$, with the password embedded point, $(X_P, Y_P, Z_P)$;

recovering by the client computer device the first cipher point from the transmitted bits; and determining by the client computer device the second cipher point $(X_{SC}, Y_{SC}, Z_{SC})$ is equal to the first cipher point $(X_C, Y_C, Z_C)$ or one of its equivalent points; and authenticating the user.

9. A method for authenticating the identity of a first host computer device having a password by a second client computer device over an unsecured communications channel using a password protocol based on public key $EC^3$ cryptography using a selected elliptic curve, the method comprising:

providing a communication system including a client computer device and a host computer device connected to said client computer device using a communication channel to provide network online services, contents and resources to one or more client devices and their users;

generating by the second device a random bit sting as a secret key, $k_s$, of the client computer device;

dividing by the client computer device the secret key $k_s$ into three binary sub-strings, $k_{S1}$, $k_{S2}$ and $k_{S3}$;

embedding by the client computer device the secret sub-string $k_{S1}$ and $k_{S2}$ into the X-coordinate and Z-coordinate using a deterministic and non-interactive process to obtain the secret-key embedded point of the client computer device, $(X_S, Y_S, Z_S)$;

determining by the client computer device a public key of the client computer device $(X_{SPu}, Y_{SPu}, Z_{SPu})$ by scalar multiplication of the scalar value of the third secret sub-string $k_{S3}$ with the secret-key embedded point of the server, $(X_S, Y_S, Z_S)$; and transmitting by the client computer device the public key of the client computer device to the first computer device.

10. The method of claim 9 further comprising:

converting by the host computer device a password or its image under a one-way function into an equivalent scalar value, $k_U$;

determining by the host computer device a first cipher point $(X_C, Y_C, Z_C)$ by scalar multiplication of the scalar value, $k_U$, with the client computer device pubic key, $(X_{SPu}, Y_{SPu}, Z_{SPu})$; and transmitting by the host computer device bits of the X-coordinate, $X_C$, and the Z-coordinate, $Z_C$, of the first cipher point $(X_C, Y_C, Z_C)$ to the client computer device.

11. The method of claim 10 further comprising:

converting the password or its image stored by the client computer device under a one-way function to an equivalent scalar value, $k_{US}$;

determining by the client computer device a second cipher point $(X_{SC}, Y_{SC}, Z_{SC})$ by scalar multiplication of the scalar value, $k_{US}$, with the client computer device pubic key, $(X_{SPu}, Y_{SPu}, Z_{SPu})$;

recovering by the client computer device the first cipher point from the transmitted bits; and determining by the client computer device the second cipher point $(X_{SC}, Y_{SC}, Z_{SC})$ is equal to the first cipher point $(X_C, Y_C, Z_C)$ or one of its equivalent points; and authenticating the user.

12. A method for authenticating the identity of a host computer device having a password by a client computer device over an unsecured communications channel using a password protocol based on public key $EC^3$ cryptography using a selected elliptic curve, the method comprising:

providing a communication system including a client computer device and a host computer device connected to said client computer device using a communication channel to provide network online services, contents and resources to one or more client devices and their users;

generating by the client computer device a random bit string that is the secret key, $k_s$, of the client computer device;

dividing by the client computer device the secret key $k_s$ into three binary sub-strings, $k_{S1}$, $k_{S2}$ and $k_{S3}$;

embedding by the client computer device the secret sub-string $k_{S1}$ and $k_{S2}$ into the X-coordinate and Z-coordinate using a deterministic and non-iterative process to obtain the secret-key embedded point of the client computer device, $(X_S, Y_S, Z_S)$;

computing by the client computer device the public key of the client computer device $(X_{SPu}, Y_{SPu}, Z_{SPu})$ by scalar multiplication of the scalar value of the third secret sub-string $k_{S3}$ with the secret-key embedded point of the server, $(X_S, Y_S, Z_S)$; and transmitting by the client computer device the public key of the client computer device to the host computer device.

13. The method of claim 12 further comprising:

converting by the host computer device the password or its image under a one-way function into a bit string;

dividing by the host computer device the user bit string into four strings, $k_{U1}$, $k_{U3}$, $k_{U3}$, $k_{U4}$;

embedding by the host computer device the sub-string $k_{U1}$ and $k_{U2}$ into the X-coordinate and Z-coordinate, using a deterministic and non-iterative process to obtain the secret-key embedded point , $(X_U, Y_U, Z_U)$;

computing by the host computer device the scalar multiplication of the scalar value, $k_{U3}$, with the client computer device public key, $(X_{SPu}, Y_{SPu}, Z_{SPu})$ and the scalar value, $k_{U4}$, with the user point, $(X_U, Y_U, Z_U)$, and determine first cipher point $(X_C, Y_C, Z_C)$, where $(X_C, Y_C, Z_C) = k_{U3}(X_{SPu}, Y_{SPu}, Z_{SPu}) + k_{U4}(X_U, Y_U, Z_U)$; and transmitting by the host computer device the bits of the X-coordinate, $X_C$, and Z-coordinate, $Z_C$, of the first cipher point $(X_C, Y_C, Z_C)$ to the client computer device.

14. The method of claim 13 further comprising:

converting by the client computer device the password or its image under a one-way function into a bit string;

dividing by the client computer device the user bit string into four strings, $k_{US}$, $k_{US3}$, $k_{US3}$, $k_{US4}$;

embedding by the client computer device the secret sub-string $k_{US1}$ and $k_{US2}$ into the X-coordinate and Z-coordinate, using a deterministic and non-iterative process to obtain the secret-key embedded point of the user, $(X_{US}, Y_{US}, Z_{US})$;

computing by the client computer device the scalar multiplication of the scalar value, $k_{US1}$, with the server pubic key, $(X_{SPu}, Y_{SPu}, Z_{SPu})$, and the scalar value, $k_{US4}$, with the user point, $(X_{US}, Y_{US}, Z_{US})$, and determining by the client computer device the second cipher point $(X_{SC}, Y_{SC}, Z_{SC})$ where, $(X_{SC}, Y_{SC}, Z_{SC}) = k_{US3}(X_{SPu}, Y_{SPu}, Z_{SPu}) + k_{US4}(X_{US}, Y_{US}, Z_{US})$;

recovering by the client computer device the first cipher point from the transmitted bits;

determining by the client computer device second cipher point is equal to the first cipher point or one of its equivalent points; and authenticating by the client computer device the first device.

15. A method to establish a password pw, the method comprising:

providing a communication system including a client computer device and a host computer device connected to said client computer device using a communication channel to provide network online services, contents and resources to one or more client devices and their users;

selecting a random salt a;

determining a one way has function where $x = H(a, pw)$;

determining a password verifier $(X_v, Y_v, Z_v)$ by scalar multiplication of x with a base point $(X_B, Y_B, Z_B)$; and storing $(X_v, Y_v, Z_v)$ and a as the password verifier and salt, wherein p is a large prime number and (X, Y, Z) is an elliptic curve point defined over a selected elliptic curve in projective coordinates defined over a finite field.

16. A method to authenticate the identity of a host computer device by a client computer device where p is a large prime number and (X, Y, Z) is an elliptic curve point defined over a projected elliptic curve in projective coordinates defined over finite field, the method comprising:

sending an identifier of the host computer device to the client computer device;

retrieving by the client computer device a stored password verifier $(X_v, Y_v, Z_v)$ and corresponding salt a of the host computer device;

sending a to the host computer device from the client computer device;

determining a long-term private key x of the host computer device using a one way hash function of a and the password pw;

generating by the host computer device a random number u, where $1 < u < p$, determining by the host computer device a first ephemeral public key $(X_U, Y_U, Z_U)$ by scalar multiplication of u and the base point $(X_B, Y_B, Z_B)$;

sending the first ephemeral public key projective coordinates X coordinate $X_U$ and the Z coordinate $Z_U$ from the host computer device to the client computer device, wherein the projective coordinates ensure that the projected elliptic curve and its twist are isomorphic to each other.

17. The method of claim 16 wherein the client computer device generates its own random number s, $1 < s < p$, computes a second ephemeral public key $(X_S, Y_S, Z_S) = (X_v, Y_v, Z_v) + s(X_B, Y_B, Z_B)$, and sends the second ephemeral public key X coordinate $X_S$ and the Z coordinate $Z_S$ to the host computer device with a randomly generated parameter t.

18. The method of claim 17 further comprising computing by the host computer device and client computer device the common exponential value $(X_{SU}, Y_{SU}, Z_{SU})$ using the values available to each device wherein if the password pw matches the password used to generate $(X_v, Y_v, Z_v)$, then both values of $(X_{SU}, Y_{SU}, Z_{SU})$ match.

19. The method of claim 18 wherein both the host computer and client computer devices hash $X_{SU}$, and $Z_{SU}$ into a session key K, the host computer device sends the client computer device M[1] to indicated that it has the correct session key, and the client computer device determines M[1] itself to verify that it matches the value for M[1] sent by the host computer device where M[1]=$H(X_U, \overline{Z_U}, X_S, Z_S, K)$ and $H(\bullet)$ is a one way hash function.

20. The method of claim 19 wherein the client computer device sends the host computer device M[2] to indicate that the client computer device also has the correct session key, the host computer device verifies M[2] itself, accepting only if it matches the client computer device value for M[2], and both the host computer and client computer devices agree on the session key $(X_{SU}, Y_{SU}, Z_{SU})$ where M[2]=$H(X_U, Z_U, M[1], K)$.

21. The method claim 20 further comprising using K to encrypt subsequent session traffic between the host computer and client computer devices.

* * * * *